United States Patent
Nosler et al.

(10) Patent No.: US 8,371,211 B2
(45) Date of Patent: Feb. 12, 2013

(54) MACHINE FOR BREWING A BEVERAGE SUCH AS COFFEE AND RELATED METHOD

(75) Inventors: Zander Nosler, Seattle, WA (US); Randy Hulett, Seattle, WA (US); Jorah Wyer, Providence, RI (US); Michael Baum, Seattle, WA (US); Jeff Allison, Lake Oswego, OR (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 12/976,663

(22) Filed: Dec. 22, 2010

(65) Prior Publication Data
US 2011/0088560 A1 Apr. 21, 2011

Related U.S. Application Data

(60) Division of application No. 11/974,521, filed on Oct. 11, 2007, now abandoned, which is a continuation of application No. PCT/US2006/013930, filed on Apr. 11, 2006.

(60) Provisional application No. 60/670,955, filed on Apr. 11, 2005, provisional application No. 60/719,069, filed on Sep. 20, 2005, provisional application No. 60/790,417, filed on Apr. 6, 2006.

(51) Int. Cl.
*A47J 31/00* (2006.01)
*A23F 5/00* (2006.01)

(52) U.S. Cl. ............. 99/279; 99/289 R; 99/297; 99/299; 99/287; 99/283

(58) Field of Classification Search .................... 99/279, 99/289 R, 297, 299, 287, 283; 426/432–434
See application file for complete search history.

(56) References Cited

U.S. PATENT DOCUMENTS

| | | | | |
|---|---|---|---|---|
| 1,390,008 A | * | 9/1921 | Arduino | 99/286 |
| 2,315,777 A | * | 4/1943 | Denton | 99/289 R |
| 2,907,266 A | * | 10/1959 | Moulden | 99/289 R |
| 2,935,011 A | * | 5/1960 | Perlman | 99/283 |
| 3,286,618 A | * | 11/1966 | Barrera | 99/302 R |
| 3,295,998 A | | 1/1967 | Goros | |
| 3,389,948 A | | 6/1968 | Kenney et al. | |
| 3,390,626 A | | 7/1968 | Holstein et al. | |
| 4,188,863 A | | 2/1980 | Grossi | |

(Continued)

FOREIGN PATENT DOCUMENTS

| | | |
|---|---|---|
| BE | 875008 | 9/1979 |
| DE | 3233085 | 3/1984 |

(Continued)

OTHER PUBLICATIONS

ISR for PCT/US2006/036844, mailed Jan. 15, 2007.

(Continued)

*Primary Examiner* — Samuel M Heinrich
(74) *Attorney, Agent, or Firm* — Knobbe Martens Olson & Bear LLP

(57) ABSTRACT

A machine for brewing a beverage such as coffee includes a chamber and a piston disposed in the chamber. The piston is operable to move to a first position to allow the chamber to receive a liquid and a flavor base such as ground coffee, to remain in the first position for a time sufficient for the beverage to brew, and to move to a second position to dispense the beverage by forcing the beverage out of the chamber. By modifying some or all steps of the French press brewing technique, the machine can typically control coffee-brewing parameters with a level of precision that yields brewed coffee having a uniform taste from cup to cup, and can typically brew the coffee with a speed that renders the machine suitable for use by establishments that serve significant amounts of coffee.

26 Claims, 8 Drawing Sheets

U.S. PATENT DOCUMENTS

| | | | |
|---|---|---|---|
| 4,237,536 A | 12/1980 | Enelow et al. | |
| 4,278,186 A | 7/1981 | Williamson | |
| 4,328,740 A | 5/1982 | McDonough et al. | |
| 4,468,406 A | 8/1984 | d'Alayer de Costemore d'Arc | |
| 4,506,596 A | 3/1985 | Shigenobu et al. | |
| 4,595,131 A | 6/1986 | Ruskin et al. | |
| 4,653,389 A | 3/1987 | Hayes | |
| 4,665,808 A * | 5/1987 | Pulvermuller | 99/285 |
| 4,766,548 A | 8/1988 | Cedrone et al. | |
| 4,790,239 A | 12/1988 | Hewitt | |
| 4,797,296 A | 1/1989 | Meier et al. | |
| 4,798,222 A | 1/1989 | Kauffman | |
| 4,801,375 A | 1/1989 | Padilla | |
| 4,817,044 A | 3/1989 | Ogren | |
| 4,833,979 A | 5/1989 | Garulli et al. | |
| 4,852,472 A | 8/1989 | In-Albon et al. | |
| 4,853,684 A | 8/1989 | Hoppstadter | |
| 4,873,916 A | 10/1989 | Piscaer | |
| 4,882,983 A | 11/1989 | Pastrick | |
| 4,888,466 A | 12/1989 | Hoffmann | |
| 4,944,217 A | 7/1990 | Watanabe | |
| 4,949,257 A | 8/1990 | Orbach | |
| 4,983,412 A | 1/1991 | Hauslein | |
| 4,993,315 A | 2/1991 | Huber et al. | |
| 5,072,660 A | 12/1991 | Helbling | |
| 5,091,713 A | 2/1992 | Horne et al. | |
| 5,094,153 A * | 3/1992 | Helbling | 99/280 |
| 5,139,127 A | 8/1992 | Ficken et al. | |
| 5,144,886 A | 9/1992 | Gockelmann et al. | |
| 5,146,839 A | 9/1992 | Gockelmann et al. | |
| 5,153,016 A * | 10/1992 | Gockelmann | 426/433 |
| 5,158,793 A | 10/1992 | Helblinig | |
| 5,183,998 A | 2/1993 | Hoffman et al. | |
| 5,192,000 A | 3/1993 | Wandrick et al. | |
| 5,203,366 A | 4/1993 | Czeck et al. | |
| 5,207,148 A | 5/1993 | Anderson et al. | |
| 5,230,277 A | 7/1993 | Bianco | |
| 5,230,278 A | 7/1993 | Bunn et al. | |
| 5,241,898 A | 9/1993 | Newnan | |
| 5,255,593 A | 10/1993 | Bunn et al. | |
| 5,259,296 A | 11/1993 | Mikael et al. | |
| 5,299,135 A | 3/1994 | Lieto et al. | |
| 5,337,653 A * | 8/1994 | Sellers | 99/289 R |
| 5,375,508 A | 12/1994 | Knepler et al. | |
| 5,404,794 A | 4/1995 | Patel et al. | |
| 5,406,882 A | 4/1995 | Shaanan | |
| 5,440,972 A * | 8/1995 | English | 99/282 |
| 5,462,236 A | 10/1995 | Knepler | |
| 5,465,649 A | 11/1995 | Muis | |
| 5,490,447 A * | 2/1996 | Giuliano | 99/286 |
| 5,495,793 A | 3/1996 | Muis et al. | |
| 5,542,342 A | 8/1996 | McNeill et al. | |
| 5,586,484 A | 12/1996 | Piazza | |
| 5,590,288 A | 12/1996 | Castor et al. | |
| 5,612,890 A | 3/1997 | Strasser et al. | |
| 5,622,099 A | 4/1997 | Frei | |
| 5,623,864 A | 4/1997 | Moore et al. | |
| 5,629,863 A | 5/1997 | Palozzi et al. | |
| 5,635,235 A * | 6/1997 | Sanchez et al. | 426/496 |
| 5,638,739 A | 6/1997 | Shaanan et al. | |
| 5,644,972 A | 7/1997 | Dahmen et al. | |
| 5,659,482 A | 8/1997 | Carr et al. | |
| 5,694,115 A | 12/1997 | Desatoff | |
| 5,718,163 A | 2/1998 | Termini | |
| 5,823,096 A | 10/1998 | Shih | |
| 5,878,654 A | 3/1999 | Kobayashi et al. | |
| 5,911,810 A | 6/1999 | Kawabata | |
| 5,913,180 A | 6/1999 | Ryan | |
| 5,913,454 A | 6/1999 | McHale | |
| 5,913,963 A | 6/1999 | King | |
| 5,930,771 A | 7/1999 | Stapp | |
| 5,939,974 A | 8/1999 | Heagle et al. | |
| 5,941,363 A | 8/1999 | Partyka et al. | |
| 5,967,367 A | 10/1999 | Orsborn | |
| 5,979,299 A | 11/1999 | Dineen et al. | |
| 6,056,194 A | 5/2000 | Kolls | |
| 6,095,032 A | 8/2000 | Barnett | |
| 6,098,525 A | 8/2000 | Gijzel et al. | |
| 6,115,649 A | 9/2000 | Sakata | |
| 6,116,147 A | 9/2000 | Schmed | |
| 6,127,185 A | 10/2000 | Melton et al. | |
| 6,135,010 A | 10/2000 | Husted et al. | |
| 6,181,981 B1 | 1/2001 | Varga et al. | |
| 6,182,555 B1 | 2/2001 | Scheer et al. | |
| 6,192,737 B1 | 2/2001 | Ohlrogge et al. | |
| 6,234,354 B1 | 5/2001 | Phillips et al. | |
| 6,240,833 B1 | 6/2001 | Sham et al. | |
| 6,253,664 B1 | 7/2001 | Giannelli | |
| 6,305,268 B1 | 10/2001 | Schamberg et al. | |
| 6,324,966 B1 | 12/2001 | Joergensen | |
| 6,324,967 B1 | 12/2001 | Robinson | |
| 6,351,688 B1 | 2/2002 | Nichols et al. | |
| 6,382,083 B2 | 5/2002 | Schmed | |
| 6,391,360 B1 | 5/2002 | Stettes et al. | |
| 6,401,729 B1 | 6/2002 | Ford | |
| 6,431,055 B2 | 8/2002 | Bonanno | |
| 6,435,406 B1 | 8/2002 | Pentel | |
| 6,460,735 B1 | 10/2002 | Greenwald et al. | |
| 6,513,419 B2 | 2/2003 | Huber et al. | |
| 6,526,872 B2 | 3/2003 | Wong | |
| 6,550,642 B2 | 4/2003 | Newman et al. | |
| 6,564,697 B2 | 5/2003 | Maxwell et al. | |
| 6,565,023 B2 | 5/2003 | Schmitt | |
| 6,595,107 B2 | 7/2003 | Hart et al. | |
| 6,600,969 B2 | 7/2003 | Sudolcan et al. | |
| 6,606,937 B2 | 8/2003 | Lassota | |
| 6,612,224 B2 | 9/2003 | Mercier et al. | |
| 6,628,764 B1 | 9/2003 | Petite | |
| 6,659,048 B1 | 12/2003 | DeSantis et al. | |
| 6,672,200 B2 | 1/2004 | Duffy et al. | |
| 6,684,756 B2 | 2/2004 | Kerr | |
| 6,688,134 B2 | 2/2004 | Barton et al. | |
| 6,705,208 B2 | 3/2004 | Lassota | |
| 6,734,878 B1 | 5/2004 | DeLuca et al. | |
| 6,739,240 B2 | 5/2004 | De Koning et al. | |
| 6,742,553 B2 | 6/2004 | Sato et al. | |
| 6,745,668 B2 | 6/2004 | Levi et al. | |
| 6,752,069 B1 | 6/2004 | Burke et al. | |
| 6,759,072 B1 | 7/2004 | Gutwein et al. | |
| 6,807,898 B2 | 10/2004 | De Koning et al. | |
| 6,817,280 B2 | 11/2004 | Hall et al. | |
| 6,819,976 B2 | 11/2004 | Kimura | |
| 6,821,541 B2 | 11/2004 | Lee | |
| 6,834,317 B2 | 12/2004 | Chadwell et al. | |
| 6,842,721 B2 | 1/2005 | Kim et al. | |
| 6,853,958 B1 | 2/2005 | Turin et al. | |
| 6,857,352 B2 | 2/2005 | Fischer | |
| 6,857,354 B2 | 2/2005 | Reyhanloo | |
| 6,880,750 B2 | 4/2005 | Pentel | |
| 6,893,481 B2 | 5/2005 | Nam et al. | |
| 6,901,846 B2 | 6/2005 | Ruckstuhl | |
| 6,915,732 B2 | 7/2005 | Jones et al. | |
| 6,931,984 B2 | 8/2005 | Lassota | |
| 6,934,602 B2 | 8/2005 | Sudolcan et al. | |
| 6,945,014 B1 | 9/2005 | Quann | |
| 6,958,693 B2 | 10/2005 | Rothgeb et al. | |
| 6,964,223 B2 | 11/2005 | O'Loughlin | |
| 7,013,337 B2 | 3/2006 | Defosse et al. | |
| 7,021,197 B2 | 4/2006 | Chen et al. | |
| 7,024,984 B2 | 4/2006 | Leung et al. | |
| 7,066,079 B2 | 6/2006 | Sager | |
| 7,151,968 B2 | 12/2006 | Williamson | |
| 7,158,918 B2 | 1/2007 | Bunn et al. | |
| 7,162,391 B2 | 1/2007 | Knepler et al. | |
| 7,197,377 B2 | 3/2007 | Knepler et al. | |
| 7,201,098 B2 | 4/2007 | Wang | |
| 7,204,259 B2 | 4/2007 | Crisp | |
| 7,219,599 B2 | 5/2007 | Geiger | |
| 7,223,427 B2 | 5/2007 | Knepler et al. | |
| 7,234,389 B1 | 6/2007 | Lassota | |
| 7,268,698 B2 | 9/2007 | Hart et al. | |
| 7,273,005 B2 | 9/2007 | Turi | |
| 7,387,239 B2 | 6/2008 | Thomas et al. | |
| 7,437,990 B2 | 10/2008 | Duch | |
| 7,440,817 B2 | 10/2008 | Fu | |
| 7,481,152 B2 | 1/2009 | Steckhan et al. | |
| 7,555,979 B2 | 7/2009 | Shultis | |

| | | |
|---|---|---|
| 7,571,674 B2 | 8/2009 | Wang |
| 7,607,385 B2 | 10/2009 | Halliday et al. |
| 7,673,555 B2 | 3/2010 | Nosler et al. |
| 7,673,558 B2 | 3/2010 | Panesar et al. |
| 2002/0130136 A1 | 9/2002 | Segal |
| 2003/0024386 A1 | 2/2003 | Burke |
| 2003/0066430 A1 | 4/2003 | Bitar et al. |
| 2003/0070555 A1 | 4/2003 | Reyhanloo |
| 2003/0070979 A1 | 4/2003 | Huang |
| 2003/0074106 A1 | 4/2003 | Butler |
| 2003/0079612 A1 | 5/2003 | Con |
| 2003/0166400 A1 | 9/2003 | Lucas |
| 2003/0198465 A1 | 10/2003 | Cai |
| 2003/0208419 A1 | 11/2003 | Bunn |
| 2004/0065208 A1 | 4/2004 | Hart et al. |
| 2004/0129144 A1 | 7/2004 | Beadle |
| 2004/0163545 A1 | 8/2004 | McNair |
| 2004/0172161 A1 | 9/2004 | Sadakata et al. |
| 2004/0195263 A1 | 10/2004 | Lassota |
| 2004/0200357 A1 | 10/2004 | Wang |
| 2005/0043855 A1 | 2/2005 | Kimura |
| 2005/0061837 A1 | 3/2005 | Sudolcan et al. |
| 2005/0109214 A1 | 5/2005 | Bruttin et al. |
| 2005/0166761 A1 | 8/2005 | Jones et al. |
| 2005/0172818 A1 | 8/2005 | Hunt et al. |
| 2005/0188854 A1 | 9/2005 | Green et al. |
| 2005/0199129 A1 | 9/2005 | Glucksman et al. |
| 2006/0065128 A1 | 3/2006 | Lu |
| 2006/0090652 A1 | 5/2006 | Greiwe |
| 2006/0117960 A1 | 6/2006 | Fischer |
| 2006/0149415 A1 | 7/2006 | Richards |
| 2006/0167743 A1 | 7/2006 | Bunn |
| 2006/0173576 A1 | 8/2006 | Goerg et al. |
| 2006/0188620 A1 | 8/2006 | Gutwein et al. |
| 2006/0200271 A1 | 9/2006 | Porco |
| 2006/0238346 A1 | 10/2006 | Teller |
| 2006/0254428 A1 | 11/2006 | Glucksman et al. |
| 2006/0277101 A1 | 12/2006 | Bunn |
| 2006/0278091 A1 | 12/2006 | Rutigliano |
| 2007/0028779 A1 | 2/2007 | Pigliacampo et al. |
| 2007/0068393 A1 | 3/2007 | Nosler et al. |
| 2007/0119308 A1 | 5/2007 | Glucksman et al. |
| 2007/0138262 A1 | 6/2007 | Lai |
| 2007/0170249 A1 | 7/2007 | Rademacher |
| 2007/0187425 A1 | 8/2007 | Knepler |
| 2007/0296608 A1 | 12/2007 | Hart et al. |
| 2008/0000358 A1 | 1/2008 | Goeckner et al. |
| 2008/0095903 A1 | 4/2008 | Weijers |
| 2008/0148956 A1 | 6/2008 | Maurer |
| 2008/0168905 A1 | 7/2008 | Hart |
| 2008/0178743 A1 | 7/2008 | Hug |
| 2008/0190297 A1 | 8/2008 | Gussmann |
| 2008/0195252 A1 | 8/2008 | Innocenti et al. |
| 2008/0202345 A1 | 8/2008 | Delonghi |
| 2008/0264266 A1 | 10/2008 | Carbonini |
| 2008/0269947 A1 | 10/2008 | Beane et al. |
| 2009/0056555 A1 | 3/2009 | Beule |
| 2009/0095165 A1 | 4/2009 | Nosler et al. |
| 2009/0136639 A1 | 5/2009 | Majer |
| 2009/0152345 A1 | 6/2009 | Johnson |
| 2010/0024657 A9 | 2/2010 | Nosler et al. |
| 2010/0154645 A1 | 6/2010 | Nosler et al. |

FOREIGN PATENT DOCUMENTS

| | | | |
|---|---|---|---|
| DE | 3233085 A1 | | 3/1984 |
| DE | 29915025 U1 | | 1/2000 |
| EP | 0000685 B1 | | 9/1982 |
| EP | 0473289 | | 3/1992 |
| EP | 0564399 A2 | | 10/1993 |
| EP | 0280345 | | 8/1998 |
| EP | 0885582 A1 | | 12/1998 |
| EP | 1306040 A1 | | 5/2003 |
| EP | 0993800 A1 | | 12/2003 |
| FR | 2651664 | | 3/1991 |
| JP | 63-177234 U | | 11/1988 |
| JP | 406339433 | | 12/1994 |
| JP | 08107826 A | * | 4/1996 |
| JP | 11009461 | | 1/1999 |
| JP | 2002-223922 A | | 8/2002 |
| RU | 2086169 | | 8/1997 |
| SU | 1502106 A | * | 8/1989 |
| SU | 1711806 | | 2/1992 |
| WO | WO 03/101264 | | 12/2003 |
| WO | WO 2004/023949 | | 3/2004 |

OTHER PUBLICATIONS

ISR for PCT/US2006/013930, mailed Jul. 30, 2007.
Patent Office of the Russian Federation, Decision on Grant, Nov. 9, 2009, pp. 1-9.
Japanese Office Action dated Dec. 20, 2011 issued by the Japanese Patent Office, 7 pages.

* cited by examiner

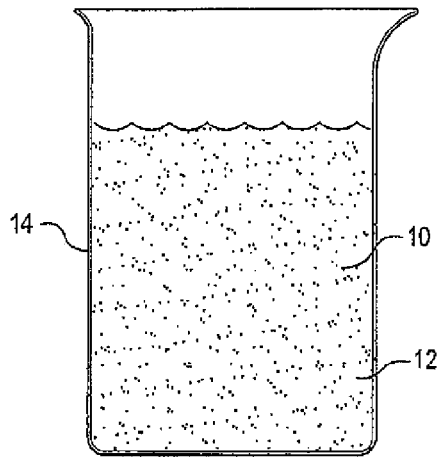
FIG. 1
(PRIOR ART)
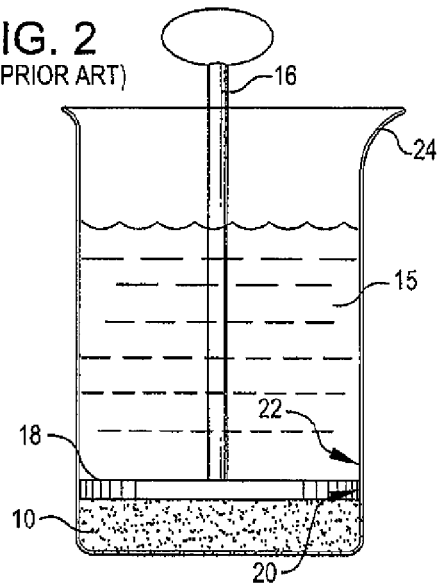
FIG. 2
(PRIOR ART)
FIG. 3
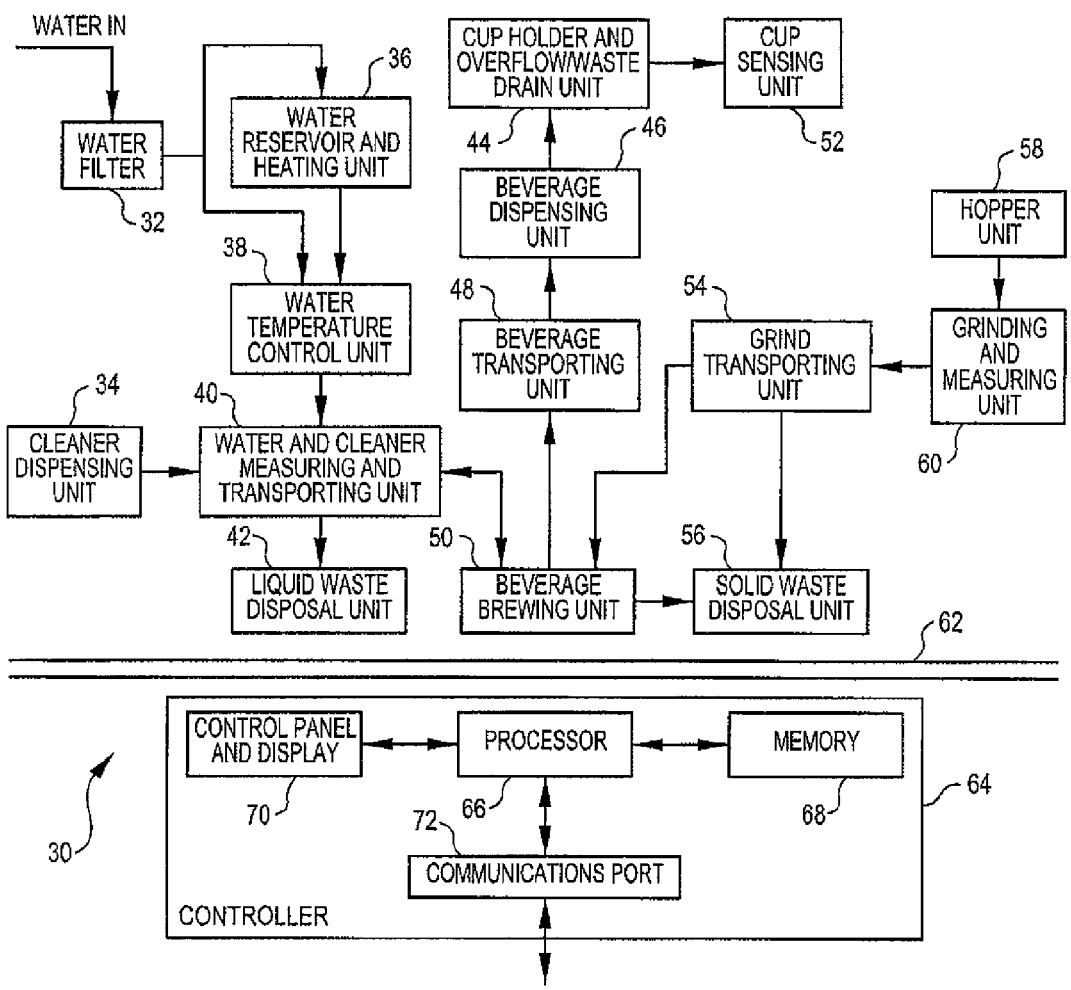

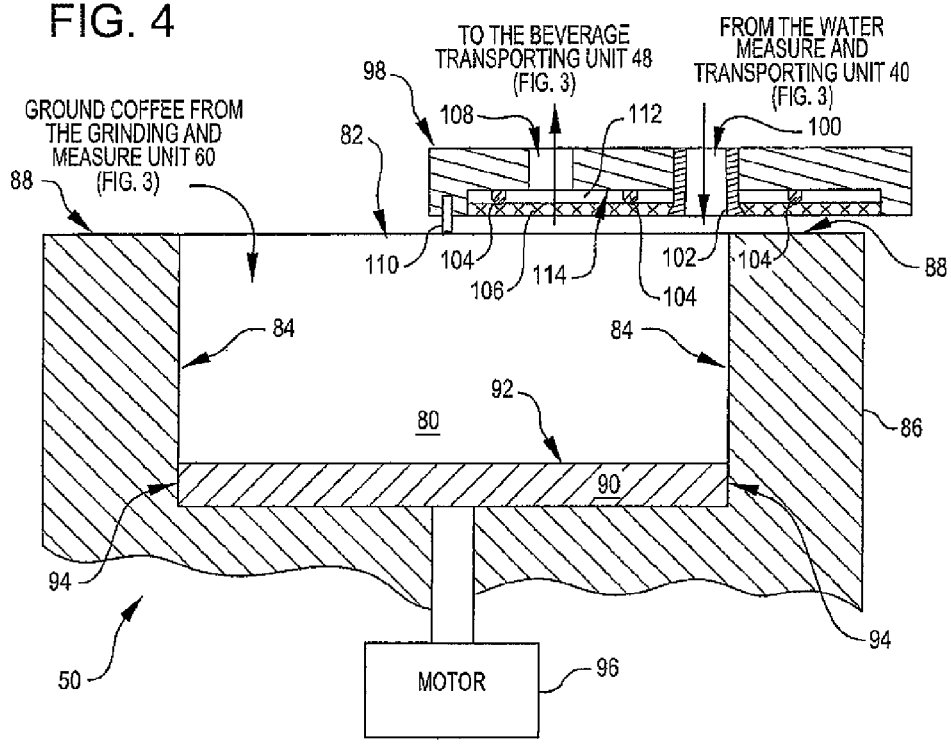
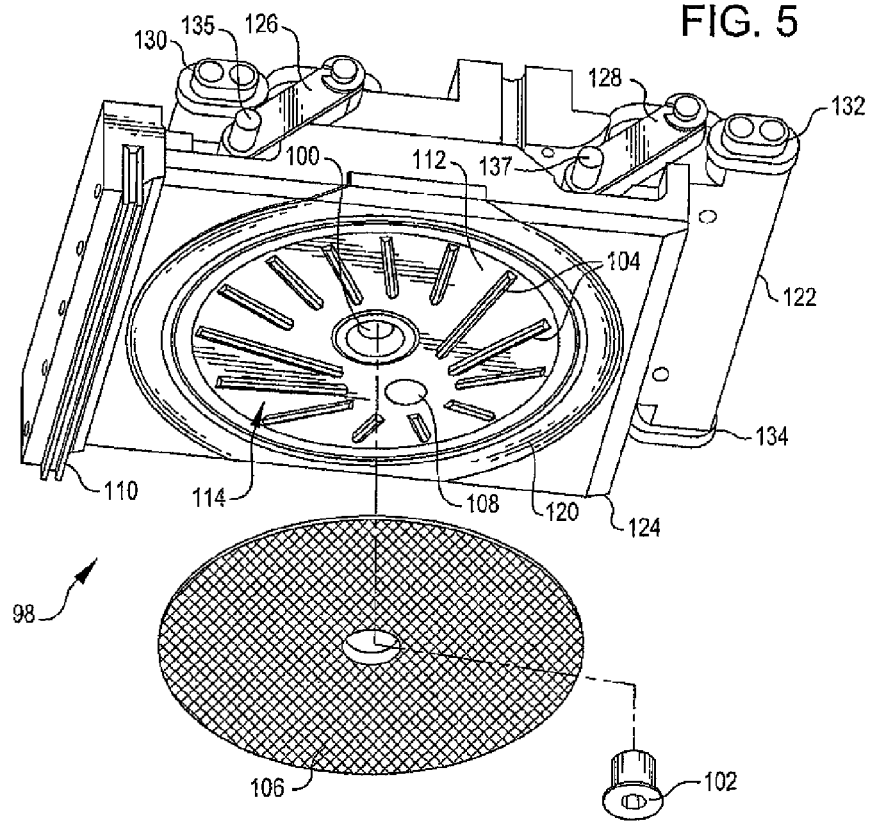

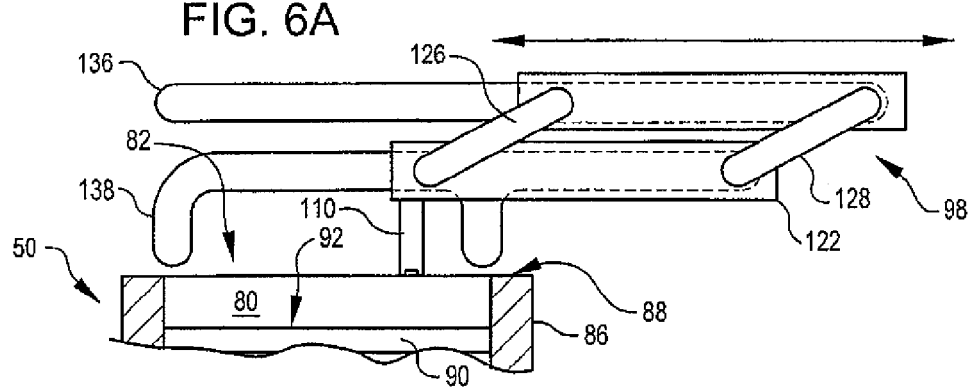
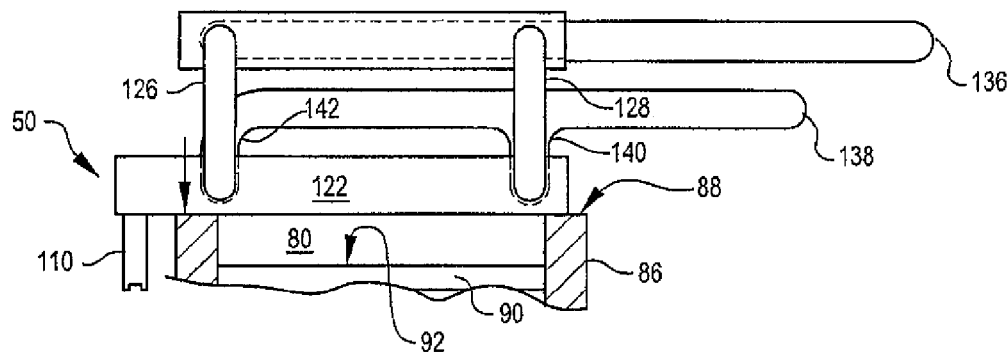
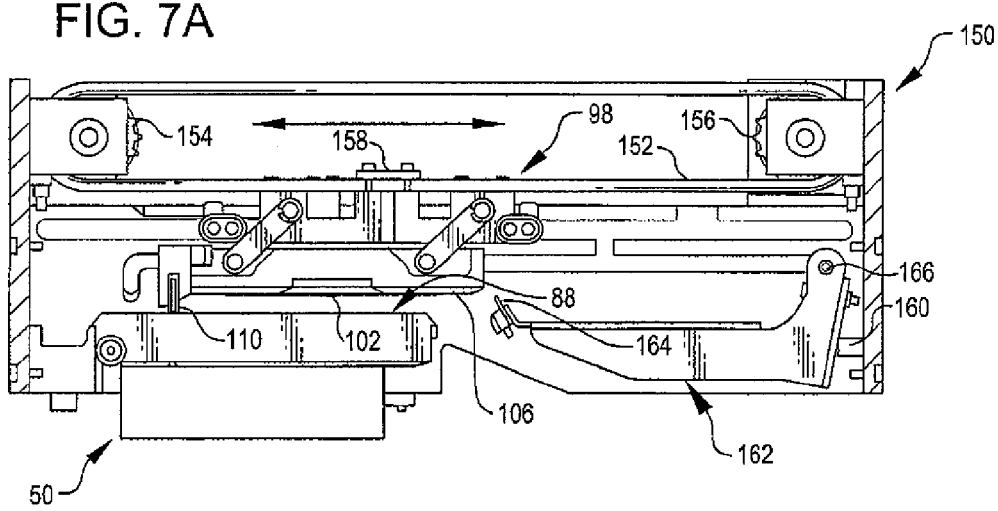

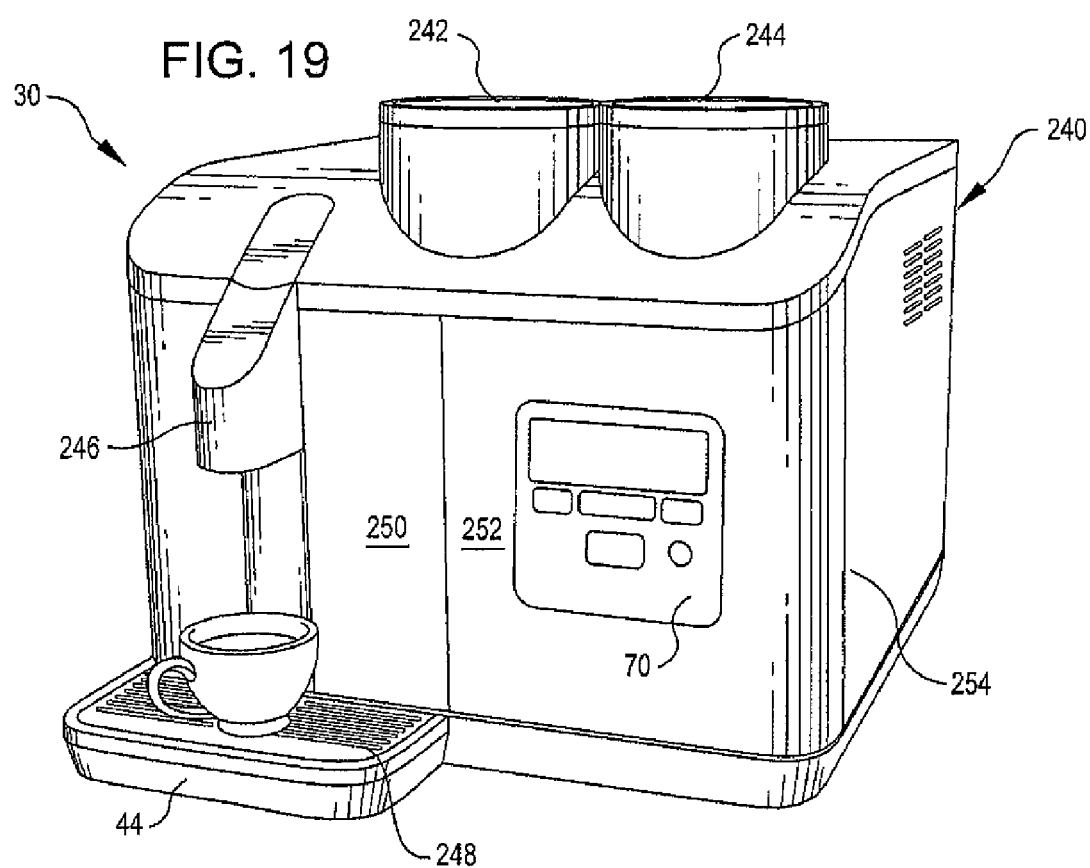

MACHINE FOR BREWING A BEVERAGE SUCH AS COFFEE AND RELATED METHOD

CLAIM OF PRIORITY

This application is a divisional of, and thus claims the benefit of, U.S. application Ser. No. 11/974,521 filed on Oct. 11, 2007, which in turn is a continuation of PCT Application No. PCT/US2006/013930, designating the United States, and filed on Apr. 11, 2006, which in turn claims the benefit of U.S. Provisional Application Nos. 60/670,955 filed on Apr. 11, 2005, 60/719,069 filed on Sep. 20, 2005, and 60/790,417 filed on Apr. 6, 2006. The disclosures of each of the foregoing applications are hereby incorporated by reference in their entirety.

BACKGROUND

Of the many techniques for brewing coffee, connoisseurs consider the French press technique to be one of the best for taste and efficient use of ground coffee (efficiency is proportional to the ratio of the amount of coffee brewed to the amount of ground coffee used). It is theorized that the good taste and efficiency is a result of the relatively thorough wetting of the coffee grounds that the French press technique allows. Wetting is function of the surface area of the coffee grounds in contact with water during the brewing time, and of the portion of the brewing time during which this contact occurs. The greater the contact area and contact time, the more thorough the wetting of the coffee grounds.

Referring to FIGS. 1 and 2, the French press technique is described.

Referring to FIG. 1, one places ground coffee 10 and hot water 12 in a coffee pot 14, and allows coffee to brew. Because the ground coffee 10 often floats to the surface of the water 12, one may stir or otherwise agitate the mixture of the ground coffee and the water to more thoroughly wet the individual coffee grounds that constitute the ground coffee.

Referring to FIG. 2, after the coffee 15 has brewed, one grasps a handle 16 of a filter 18, inserts the filter into the coffee pot 14, and presses the filter down toward the bottom of the pot.

Because the filter 18 passes liquid but does not pass coffee-ground-sized particles, as one presses the filter toward the bottom of the coffee pot 14, the substantially ground-free brewed coffee 15 fills the portion of the pot above the filter while the filter retains the ground coffee 10 in the portion of the pot below the filter. Of course the edge 20 of the filter 18 and the inner side 22 of the pot 14 form a seal sufficient to prevent coffee grounds from passing between the edge of the filter and the inner side of the pot.

After one presses the filter 18 below a spout 24 of the coffee pot 14, he can pour the substantially ground-free brewed coffee 15 into a cup (not shown in FIGS. 1 and 2) via the spout. Although ideally one may stop pressing the filter 18 after the filter is below the spout 24, one typically presses the filter all the way to the bottom of the coffee pot 14 to reduce the chances of undersized coffee grounds passing through the filter and into the cup.

Still referring to FIG. 2, after one pours the desired amount of brewed coffee 15, he retracts the filter 18 from the pot 14 by pulling on the handle 16, removes the ground coffee 10 from the pot, and then cleans the filter and the pot.

Unfortunately, a problem with the above-described French press technique is that it is often too time consuming and difficult for use by establishments, such as coffee shops, restaurants, and work places, that serve significant amounts of coffee. The taste of brewed coffee typically depends on the brew parameters, which include the size of the coffee grounds (i.e., the grind size or consistency), the water temperature, the ratio of ground coffee to water, and the brew time. Even a slight variation in one of the brew parameters may cause a noticeable change in the taste of the brewed coffee. Because one typically controls at least some of the French press brewing parameters manually using equipment not shown in FIGS. 1-2 (e.g., coffee grinder, thermometer, measuring cup), it is often difficult and time consuming to control these brewing parameters, particularly with the level of precision required to brew many pots of coffee having a substantially uniform taste from pot to pot. And because each cup of brewed coffee poured from the same pot typically sat in the pot for a different length of time, the taste of the brewed coffee may even change significantly from cup to cup.

SUMMARY

An embodiment of a machine for brewing a beverage such as coffee includes a chamber and a piston disposed in the chamber. The piston is operable to move to a first position to allow the chamber to receive a liquid and a flavor base such as ground coffee, to remain in the first position for a time sufficient for a beverage to brew, and to move to a second position to dispense the beverage by forcing the beverage out of the chamber.

By modifying or automating some or all steps of the French press brewing technique, such a machine can typically control the brewing parameters with a level of precision that yields brewed coffee having a uniform taste from cup to cup, and can typically brew the coffee with a speed that renders the machine suitable for use by establishments that serve significant amounts of coffee.

BRIEF DESCRIPTION OF THE DRAWINGS

FIGS. 1-2 illustrate a conventional French press technique for brewing coffee.

FIG. 3 is a block diagram of a machine for brewing a beverage such as coffee using a modified French press technique according to an embodiment of the invention.

FIG. 4 is a cut-away side view of the brewing unit of FIG. 3 according to an embodiment of the invention.

FIG. 5 is an exploded isometric view of the filter and wiper shuttle assembly of FIG. 4 according to an embodiment of the invention.

FIGS. 6A-6B are side views of the filter and wiper shuttle assembly of FIGS. 4-5 according to an embodiment of the invention.

FIGS. 7A-7C are side views of the filter and wiper shuttle assembly of FIGS. 4-6B and of a filter and wiper cleaning assembly according to an embodiment of the invention.

FIG. 19 is a perspective view of the beverage-brewing machine of FIG. 3 according to an embodiment of the invention.

DETAILED DESCRIPTION

Figure 7B:
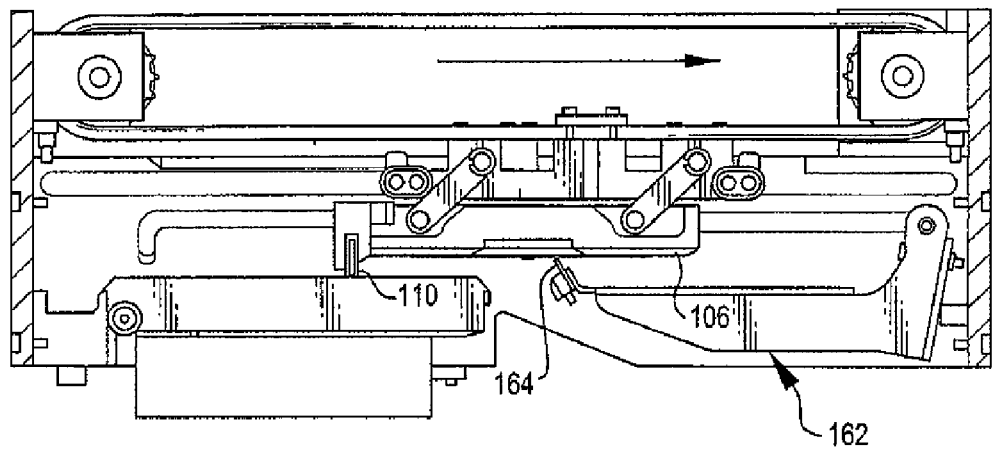

The following discussion is presented to enable a person skilled in the art to make and use one or more embodiments of the invention. The general principles described herein may be applied to embodiments and applications other than those detailed below without departing from the spirit and scope of the invention. Therefore the present invention is not intended to be limited to the embodiments shown, but is to be accorded the widest scope consistent with the principles and features disclosed or suggested herein.

FIG. 3 is a block diagram of a machine 30 for brewing a beverage according to an embodiment of the invention. The beverage-brewing machine 30 can brew coffee one cup at a time using an automated and modified French press technique, which allows the machine to brew coffee more quickly and more uniformly from cup to cup than can a human operator performing the conventional French press technique described above in conjunction with FIGS. 1-2. Consequently, the machine 30 is often more suitable for establishments that brew and serve significant amounts of coffee than is a human operator performing the conventional French press technique.

The machine 30 includes the following components: a water filter 32, cleaner-dispensing unit 34, water-reservoir-and-heating unit 36, water-temperature-control unit 38, water-and-cleaner-measuring-and-transporting unit 40, liquid-waste-disposal unit 42, cup-holder-and-overflow/waste-drain unit 44, beverage-dispensing unit 46, beverage-transporting unit 48, beverage-brewing unit 50, cup-sensing unit 52, grind-transporting unit 54, solid-waste-disposal unit 56, hopper unit 58, grinding-and-measuring unit 60, barrier 62, and controller 64. And although the machine 30 may brew beverages (e.g., tea, cocoa) other than coffee, for purposes of explanation the structure and operation of the machine are described in conjunction with the machine brewing coffee.

The water filter 32 filters the water that is used to brew the coffee. But one may omit the filter 32 from the beverage-brewing machine 30, particularly where the machine is installed in an establishment that has a water-purification system separate from the machine.

The cleaner-dispensing unit 34 stores a cleaning solution that the beverage-brewing machine 30 may use to clean some of the above-described components during a cleaning cycle, which is described in more detail below in conjunction with FIG. 16. Suitable cleaning solutions include vinegar, ammonia, soap-based solutions, and mixtures thereof.

The water-reservoir-and-heating unit 36 receives and stores water from the water filter 32, and, under the control of the controller 64, heats the stored water to a desired temperature, for example a temperature in the range from 150° F. to just below the boiling point of water. The heating element may be electric or any other type of conventional heating element, and a sensor (not shown in FIG. 3) indicates to the controller 64 the temperature of the water in the reservoir. In one implementation, the capacity of the reservoir and the thermal output of the heating element are such that the machine 30 can brew a 16 ounce cup of coffee in approximately 50 seconds, and can brew ten 16 ounce cups of coffee in approximately 10 minutes. Alternatively, the reservoir-and-heating unit 36 may include a manually settable thermostat that maintains the temperature of the water at the temperature to which the thermostat is set.

The water-temperature-control unit 38 can alter the temperature of the water from the reservoir unit 36 to allow a different brew temperature from cup to cup. The temperature-control unit 38 receives water from the reservoir 36 during a beverage-brewing cycle, and, in response to the controller 64, adjusts the temperature of the water received from the reservoir. In one implementation, the temperature-control unit 38 mixes the heated water from the reservoir 36 with colder water from the filter 32 to lower the temperature of the water used to brew coffee from the temperature of the water in the reservoir. The temperature-control unit 38 may operate in an open-loop configuration by relying on a thermodynamic algorithm that, using the sensed temperatures of the heated and cold water, regulates the amount of cold water mixed with the heated water to provide water having a desired temperature. Alternatively, the temperature control unit 38 may operate in a closed-loop configuration by sensing the temperature of the provided water and, in response to the sensed temperature, regulating the amount of cold water mixed with the heated water to provide water having the desired temperature. Moreover, instead of actually mixing cold tap water from the filter 32 with the heated water, the temperature-control unit 38 may include a heat exchanger that allows the cold water to cool the heated water without actually mixing with the heated water. The temperature control unit 38 may also be able to heat the water used to brew the coffee above the temperature of the water in the reservoir 36.

Alternatively, one may omit the water-temperature-control unit 38 from the machine 30, and depend on the reservoir-and-heating unit 36 to heat the water to the desired temperature. An advantage of the temperature-control unit 38 is that it provides water at the desired brew temperature relatively quickly if the water in the reservoir 36 is at or higher than the desired brew temperature; a disadvantage is that the unit 38 may add complexity and expense to the machine 30. Comparatively, although omitting the temperature-control unit 38 may slow the machine's brewing speed, the reservoir-and-heating unit 36 can heat the water used to brew each cup of coffee from a base temperature to any desired brewing temperature under software control (via the controller 64) without adding any expense or complexity to the machine. Typically, the cold tap water entering the reservoir 36 to replace the expelled brew water drops the temperature of the water in the reservoir to or below the baseline temperature, thus readying the reservoir for the next cup.

The water-and-cleaner-measuring-and-transporting unit 40 transports a predetermined amount of water from the temperature-control unit 38 to the brewing unit 50 during a brewing cycle, and transports a predetermined amount of cleaning solution to the brewing unit during a cleaning cycle. The measuring-and-transporting unit 40 may also direct liquid waste from the brewing unit 50 to the liquid-waste disposal unit 42 as discussed below in conjunction with FIGS. 13-18. The unit 40 includes one or more electronically controllable valves, which, in response to the controller 64, direct the water, cleaning solution, and liquid waste as described above and as described below in conjunction with FIGS. 13-18. Furthermore, the unit 40 measures the water and cleaning solution transported to the brewing chamber 50 as described below in conjunction with FIGS. 13-18. Moreover, the unit 40 may provide hot water directly to the beverage dispensing unit 46 so that one can obtain hot water for any desired use.

The liquid-waste disposal unit 42 receives liquid waste from the measuring-and-transporting unit 40 and disposes of this waste. The disposal unit 42 may include a drain (not shown in FIG. 3) that is connected to the sewer line (not shown in FIG. 3) of the establishment in which the machine 30 is installed. Alternatively, the disposal unit 42 may receive liquid waste from the beverage transporting unit 48 or from another component of the machine 30.

The cup-holder-and-overflow/waste-drain unit 44 holds a cup (not shown in FIG. 3) while the beverage-dispenser unit 46 fills the cup with the brewed beverage (or hot water as described above). The unit 44 also includes a drain portion to absorb, e.g., spillage from the cup and drippings from the dispenser unit 46 after the cup has been removed. The drain portion of the unit 44 may be removable for emptying, or may be connected to the liquid-waste disposal unit 42 or directly to the sewer line of the establishment in which the machine 30 is installed.

The beverage-dispensing unit 46 includes a spout (not shown in FIG. 3), and dispenses the brewed beverage into the cup (not shown in FIG. 3) as discussed in the preceding paragraph.

The beverage-transporting unit 48 transports the brewed beverage from the brewing unit 50 to the dispensing unit 46. The unit 48 may include an electronically controllable valve (not shown in FIG. 3), which, in response to the controller 64, opens after the brewing unit 50 has brewed the beverage to allow the beverage to flow to the dispensing unit 46. To prevent the dispensing unit 46 from dispensing a beverage when no cup is present, the controller 64 may close the valve if the cup sensor 52 indicates that no cup is present in the cup-holder portion of the unit 44. The controller 64 may also close the valve at other times as described below in conjunction with FIGS. 13-18.

The beverage-brewing unit 50 receives heated water from the measuring-and-transporting unit 40, receives ground coffee from the grind-transporting unit 54, brews coffee, and then provides the brewed coffee to the beverage-dispensing unit 46 via the beverage-transporting unit 48. The brewing unit 50 is further described below in conjunction with FIGS. 4-8 and 13-18.

As discussed above, the cup-sensing unit 52 indicates to the controller 64 whether a cup (not shown in FIG. 3) is present in the cup holder 44. If the cup is not present after the brewing unit 50 has brewed coffee, then the controller 64 may deactivate the beverage-transporting unit 48 to prevent the beverage-dispensing unit 46 from dispensing brewed coffee directly into the drain portion of the drain unit 44. Alternatively, if the cup is present during a cleaning cycle, then the controller 64 may deactivate the beverage-transporting unit 48 to prevent cleaning solution from entering the cup. The cup-sensing unit 52 may include any type of sensor, such as an optical, mechanical, or ultrasonic sensor.

The grind-transporting unit 54 may include one or more electronically controllable valves, which, in response to the controller 64, route ground coffee from the grinding-and-measuring unit 60 to either the brewing unit 50 or to the solid-waste-disposal unit 56. The controller 64 may cause the unit 54 to route ground coffee to the disposal unit 56 when one wishes to "grind through" the remaining coffee beans in a hopper (not shown in FIG. 3) of the hopper unit 58 before filling the hopper with new coffee beans. Such grinding through may prevent cross contamination between different types of coffee beans.

The solid-waste disposal unit 56 receives "ground through" coffee from the grind-transporting unit 54 per the preceding paragraph, and receives spent coffee grounds and disposable filters (if used) from the brewing unit 50 as discussed below. The disposal unit 56 may include a receptacle that one periodically removes for emptying, or that is connected to an electronic garbage disposer or directly to the sewer line of the establishment in which the machine 30 is installed. In addition, the solid-waste-disposal unit 56 may be connected to receive tap water, and may use the tap water to flush "ground-through" and spent coffee from the disposal unit into the garbage disposer unit or directly into the sewer line. The disposal unit 56 may periodically commence an automatic flushing sequence, e.g., after brewing each cup of coffee. Or, one may commence the flushing sequence manually.

The hopper unit 58 includes one or more hoppers for holding coffee beans (neither shown in FIG. 3), which are gravity fed to the grinding-and-measuring unit 60. Where the hopper unit 58 includes multiple hoppers, then one can load different types of coffee beans into each hopper, thus providing the coffee drinker with a selection of coffees. In one implementation, each hopper can hold slightly more than one pound of coffee beans, e.g., 1¼ pounds. Because coffee beans typically come in one-pound containers, a hopper having a greater-than-one-pound capacity allows one to refill the hopper with a whole container of coffee beans before the hopper is completely empty.

In response to the controller 64, the grinding-and-measuring unit 60 grinds coffee beans (not shown in FIG. 3) from the hopper unit 50, and then provides to the grind-transporting unit 54 a predetermined amount of ground coffee. In one implementation, the grinding-and-measuring unit 60 continually indicates to the controller 64 the rate at which the unit is generating ground coffee, and the controller keeps track of the cumulative amount of ground coffee generated. When the cumulative amount of ground coffee equals a predetermined amount, then the controller 64 deactivates the unit 60. Techniques for indicating the rate at which the unit 60 generates ground coffee and other techniques for measuring the ground coffee are discussed below in conjunction with FIGS. 9-12. Furthermore, the unit 60 may allow one to select, via the controller 64, one of multiple grind sizes (e.g., coarse, normal, fine), as the grind size may affect the taste and other characteristics of the brewed coffee.

The barrier 62 separates the controller 64 and associated circuitry (not shown in FIG. 3) from other components of the machine 30. For example, steam from hot water and brewing or brewed coffee may condense and damage or otherwise render inoperable the controller 64. Furthermore, condensation on the conduits that carry cold tap water may cause similar problems. Therefore, a moisture barrier 62 helps keep the controller 64 and associated circuitry dry.

The controller 64 controls the operation of some or all of the other components of the brewing machine 30 as discussed above, and includes a processor 66, a memory 68, a control panel and display 70, and a communications port 72.

The processor 66 executes a software program stored in the memory 68 or in another memory (not shown), and controls the operations of the components of the machine 30 as described above and as described below.

In addition to storing one or more software programs, the memory 68 may store sets of predetermined brew parameters as discussed below in conjunction with FIGS. 13-18, and may provide working memory for the processor 66.

The control panel and display 70 allows an operator (not shown in FIG. 3) to enter brewing options (e.g., coffee type, cup size, and brewing parameters) or to select brewing options from a menu that the processor 66 may generate on the display. For example, the operator may select via the control panel and display 66 individual brewing parameters (e.g., grind size, water temperature, brewing time, and the coffee-ground-to-water ratio), or a set of predetermined brewing parameters stored in the memory 68. As an example of the latter, a coffee roaster may have determined preferred brewing parameters for its coffee. One may then store these preferred parameters in the memory 68 as a set, and associate the set with an identifier, such as the name or type of the coffee. Therefore, instead of entering or selecting each brewing parameter individually, which may be tedious, the operator merely enters or selects from a menu the identifier, and the controller 64 causes the machine 30 to brew coffee according to the set of parameters corresponding to the identifier.

The communications port 72 allows the processor 66, memory 68, and control panel and display 70 to communicate with one or more devices external to the machine 30. For example, the port 72 may be connected to a computer (not shown in FIG. 3) so that one can program or run diagnostics from the computer. Or, the port 72 may be connected to the internet, so that one can download into the memory 68 data such as sets of brewing parameters from coffee roasters or suppliers. In addition, the port 72 may receive data via a wireless channel, such as a set of brewing parameters from a RFID tag or a barcode on a container of coffee or on a coffee cup (the tag may hold the cup owner's preferred coffee type, cup size, or brew parameters). Furthermore, the port 72 may allow the processor 66 to download demographic information, such as coffee-drinker preferences and number of cups brewed, to a coffee roaster or supplier or to the manufacturer/supplier of the machine 30.

Still referring to FIG. 3, alternate embodiments of the machine 30 are contemplated. For example, one or more of the above-described units or components may be omitted, the function of multiple units may be consolidated into fewer units, or the function of a single unit may be divided among multiple units.

FIG. 4 is a cut-away side view of the beverage-brewing unit 50 of FIG. 3 according to an embodiment of the invention. As discussed above in conjunction with FIG. 3, the brewing unit 50 allows the machine 30 to brew coffee according to a modified French press technique.

The beverage-brewing unit 50 includes a brewing chamber 80 having a top opening 82 and a side wall 84 and disposed in a chamber block 86 having a top surface 88, a piston 90 disposed within the chamber and having a top surface 92 and side 94, a motor 96 for driving the piston, and a filter and wiper shuttle assembly 98. The shuttle assembly 98 is illustrated in a disengaged position in which it is not sealing the opening 82. In a closed position (not illustrated in FIG. 4), the shuttle assembly 98 covers and seals the opening 82 while coffee brews in the chamber 80.

The brewing chamber 80, which may be cylindrical, holds the ground coffee and water (neither shown in FIG. 4) while the coffee brews. One may design the shape and other features of the chamber 80 to promote agitation of the water-and-ground-coffee mixture as discussed below.

The piston 90 is the same shape as the brewing chamber 80, the side 94 of the piston forms a water-tight seal with side wall 84 of the brewing chamber, and the motor 96 moves the piston up and down within the chamber. The motor 96, which is responsive to the controller 64 (FIG. 3), may be any motor, such as a stepper motor, suitable to drive the piston 90, and may include a sensor, such as one or more limit switches, that indicates to the controller the position, speed, and traveling direction of the piston.

The shuttle assembly 98 includes an inlet 100, a nozzle 102, separator ribs 104, a filter 106, an outlet 108, and a wiper 110. A shuttle-assembly driver (not shown in FIG. 4 but described below in conjunction with FIGS. 7A-7C) moves the shuttle assembly 98 across the chamber opening 82, and causes the shuttle assembly to seal the chamber opening while coffee is brewing in the chamber 80.

The inlet 100 is a conduit that routes hot water or cleaning solution from the water-measuring-and-transporting unit 40 (FIG. 3) to the nozzle 102.

The nozzle 102 directs the water from the inlet 100 in a spray pattern to agitate the mixture of the water and the ground coffee (not shown in FIG. 4) within the chamber 80 so that the coffee grounds are more thoroughly wetted. For example, the nozzle 102 may create a pattern that causes the mixture of water and coffee grounds within the chamber 80 to swirl around as if one were stirring the mixture. Moreover, the water-measuring-and-transporting unit 40 (FIG. 3) may include a pump or other device that can, in response to the controller 64 (FIG. 3), impart a predetermined pressure to the water in the inlet 100 to increase the agitation of the water-and-coffee-ground mixture. The nozzle 102 may also hold the filter 106 in place as discussed below in conjunction with FIG. 5. Furthermore, the nozzle 102 may be positioned such that it is in the center of the chamber opening 82 when the shuttle assembly covers the brewing chamber 80, or may be positioned in any non-centered location. Moreover, the nozzle 102 may cause the water to enter the chamber at an angle to promote agitation of the water-and-coffee-ground mixture as discussed above.

The separator ribs 104 create a space 112 between the filter 106 and a bottom surface 114 of the shuttle assembly 98 to facilitate the flow of brewed coffee from the chamber 80 to the outlet 108. The ribs 104 may be attached to or integral with either the filter 106 or the bottom surface 114.

The filter 106 effectively separates spent coffee grounds from brewed coffee. After the coffee brews in the chamber 80, the motor 96 extends the piston 90 upward at a controlled speed to force the brewed coffee through the filter 106, into the space 112, and to the beverage-transporting unit 48 (FIG. 3) via the outlet 108. Although the filter 106 passes liquid (in this case brewed coffee), it does not pass solids (in this case coffee grounds) having a grain size greater than a predetermined diameter. Therefore, the filter 106 retains the coffee grounds in the chamber 80 so that the grounds do not contaminate the dispensed brewed coffee.

The wiper 110 transports the spent coffee grounds from the brewing unit 50 into the solid-waste disposal unit 56 (FIG. 3). Specifically, after the piston 90 extends to force the brewed coffee out of the chamber 80 as discussed in the preceding paragraph, the controller 64 (FIG. 3) causes the shuttle-assembly driver (not shown in FIG. 4) to raise the shuttle assembly 98 a predetermined distance so that the bottom edge of the wiper 110 is substantially even with the surface 88 of the chamber block 86. Next, the controller 64 causes the motor 96 to further extend the piston 90 until the surface 92 of the piston is substantially coplanar with the surface 88. Then, the controller 64 causes the shuttle-assembly driver to move the shuttle assembly 98 in a direction (here to the right of FIG. 4) that is substantially perpendicular to the direction in which the piston 90 moves such that the wiper 110 sweeps the spent coffee grounds from the piston surface 92, onto the surface 88, and into the solid-waste-disposal unit 56 (FIG. 3). As discussed below in conjunction with FIGS. 7A-7C, the brewing unit 50 may also include a cleaning assembly for cleaning the wiper 110 and the filter 106.

To provide a more precise control of the brewing temperature, the brewing unit 50 may include a temperature sensor and a heating/cooling mechanism (neither shown in FIG. 4). The heating/cooling mechanism may be, e.g., electric or gas. Alternatively, the heating/cooling mechanism may include a water jacket that is disposed along the side wall 84 of the chamber 80, or on the outside of the chamber block 86. To heat the water-and-ground-coffee mixture with the chamber 80, the machine 30 (FIG. 3) fills the jacket with hot water from the reservoir 36 (FIG. 3) or from another source; similarly, to cool the mixture the machine 30 fills the jacket with cold water from the filter 32 or directly from the tap. Using the temperature sensor, the controller 64 may implement closed-loop control of the brewing temperature by regulating the flow of water through the jacket.

FIG. 5 is a perspective view of the shuttle assembly 98 of FIG. 4 according to an embodiment of the invention where the brewing chamber 80 of FIG. 4 is cylindrical.

The filter 106 may be a screen made of metal or of another suitable material, may be made from a cloth or from paper, or may be a combination of a screen to filter larger coffee grounds and cloth/paper to filter smaller coffee grounds. The filter 106 and space 112 are the same shape as the chamber opening 82. Furthermore, the filter 106 may be flat, or may be slightly concave with an inner curvature facing the chamber 80.

The separating ribs 104 are arranged to form a manifold. That is, the ribs 104 are arranged so that they direct brewed coffee flowing from the chamber 80 through the filter 106 into the outlet 108.

The inlet 100 and nozzle 102 are threaded so that one can screw the nozzle into the inlet; and, as discussed above in conjunction with FIG. 4, the nozzle secures the filter 106 when the nozzle is screwed into the inlet.

In addition to the inlet 100, the nozzle 102, the ribs 104, the filter 106, the outlet 108, and the wiper 110, the shuttle assembly 98 includes a gasket 120, upper and lower portions 122 and 124, linkage members 126 and 128, which connect the upper and lower portions, and track guides 130, 132, 134, 135, and 137 (the counterparts to the guides 134, 135, and 137 are not present in FIG. 5).

Referring to FIGS. 4 and 5, the gasket 120 forms a water-tight face seal around the perimeter of the chamber opening 82 while the water-measuring-and-transporting unit 40 introduces water into the brew chamber 80, while the coffee brews, and while the piston 90 (FIG. 4) extends to dispense the brewed coffee. Alternatively, the shuttle assembly 98 may be designed to make a bore seal with the chamber opening 82.

The upper and lower portions 122 and 124, the linkage members 126 and 128, and the track guides 130, 132, 134, 135, and 137 are further described below in conjunction with FIGS. 6A and 6B.

FIG. 6A is a cut-away side view of the brewing unit 50 and the shuttle assembly 98 disengaged from the brewing unit according to an embodiment of the invention. While disengaged, the lower portion 122 of the shuttle assembly 98 is raised substantially the thickness of the wiper 110 above the surface 88 of the chamber block 86 such that the gasket 120 (FIG. 5) is spaced from the surface of the chamber block, and thus does not seal the chamber opening 82. Consequently, the wiper 110 can sweep the spent coffee grounds (not shown in FIG. 6A) off of the piston 90 as discussed above in conjunction with FIG. 4. The upper track guides including guides 130, 132, and 134 (FIG. 5) engage an upper track 136, and the lower track guides including guides 135 and 137 engage a lower track 138. The upper and lower tracks 136 and 138 are part of a shuttle-assembly drive, which is further described below in conjunction with FIGS. 7A-7C. The upper guides 130, and 132, and 134 allow the upper portion 122 of the shuttle assembly 98 to move back and forth along the upper track 136, and the lower guides 135 and 137 allow the lower portion 124 of the shuttle assembly to move back and forth along the lower track 138. Furthermore, while the shuttle assembly 98 is disengaged from the brewing unit 50, the linkage members 126 and 128 make an acute angle relative to the upper track 136.

FIG. 6B is a cut-away side view of the brewing unit 50 and the shuttle assembly 98 engaged with the brewing unit 50 according to an embodiment of the invention. In this position, the lower track guides including the guides 135 and 137 engage vertical portions 140 and 142 of the lower track 138, and force the lower portion 122 of the shuttle assembly 98 against the surface 88 of the chamber block 86 such that the gasket 120 (FIG. 5) seals the chamber opening 82.

Referring to FIGS. 6A and 6B, the operation of the shuttle assembly 98 is described according to an embodiment of the invention.

After the grind-transporting unit 54 (FIG. 3) loads ground coffee into the chamber 80 via the opening 82, the shuttle assembly 98 moves leftward from its position in FIG. 6A.

When the lower track guides 135, 137, etc. respectively engage the vertical portions 140 and 142, the linkage members straighten, and thus force the lower portion 122 of the shuttle assembly 98 toward and against the surface 88 such that the gasket 120 (FIG. 5) seals the brewing chamber 80.

After the coffee brews, the piston 90 (FIG. 4) extends to dispense the brewed coffee from the chamber 80. Because the tracks 136 and 138 compose an over-the-center-toggle configuration, the pressure generated against the lower portion 22 by the piston 90 forces the shuttle assembly 98 to the left. But because the shuttle assembly 98 can travel little or no distance to the left, the shuttle assembly remains in the engaged position of FIG. 6B. Therefore, the tracks 136 and 138 implement a stable seal, because even in the absence of force on the shuttle assembly 98 in the leftward direction, pressure within the chamber 80 will reinforce the seal, and will not cause the seal to "blow" by forcing the shuttle assembly 98 rightward.

After the piston 90 dispenses the brewed coffee, the shuttle assembly 98 moves rightward from its position in FIG. 6B. As the shuttle assembly 98 moves rightward, the lower track guides 135, 137, etc. disengage the vertical portions 140 and 142 such that the lower portion 122 of the shuttle assembly 98 moves upward and away from the surface 86. Vertically engaging and disengaging the chamber opening 82 may significantly extend the life of the gasket and other components that form the seal with the chamber opening of the chamber.

Next, the piston 90 (FIG. 4) extends further until the piston surface 92 (FIG. 4) is substantially coplanar with the surface 86. While the piston 90 is extending further, the shuttle assembly 98 may temporarily halt its rightward movement.

Then, as the shuttle assembly 98 continues moving rightward, the wiper 110 wipes the used coffee grounds (not shown in FIGS. 6A and 6B) off of the piston surface 92 and into the solid-waste-disposal unit 56 (FIG. 3).

After the wiper 110 moves past the edge of the surface 88, the shuttle assembly 98 stops, and remains in this "home" position (not shown in FIGS. 6A and 6B) until the brewing chamber 80 brews another cup of coffee, at which time the shuttle assembly repeats the above-described sequence.

FIG. 7A is side view of a portion of the brewing unit 50, the shuttle assembly 98 in a first disengaged position, and a shuttle-assembly drive 150 according to an embodiment of the invention.

The shuttle-assembly drive 150 may include a drive belt 152, drive gears 154 and 156, an attachment member 158, a solenoid plunger 160, and a cleaning assembly 162, which includes a scraper 164, optional water jets (not shown in FIG. 7A), and pivots 166 (only one shown in FIG. 7A). The plunger 160 is operable to engage and disengage the cleaning assembly 162 as described below in conjunction with FIGS. 7A-8.

The member 158 attaches the shuttle assembly 98 to the belt 152, and the drive gears 154 and 156 turn clockwise to move the shuttle assembly to the left, and turn counterclockwise to move the shuttle assembly to the right. The shuttle-assembly drive 150 may also include one or more stops (not shown) to limit the distance that the shuttle assembly 98 can move in the left or right directions. In one implementation, the ends of the tracks 136 and 138 (FIGS. 6A-6B) provide such stops.

Figure 7C:
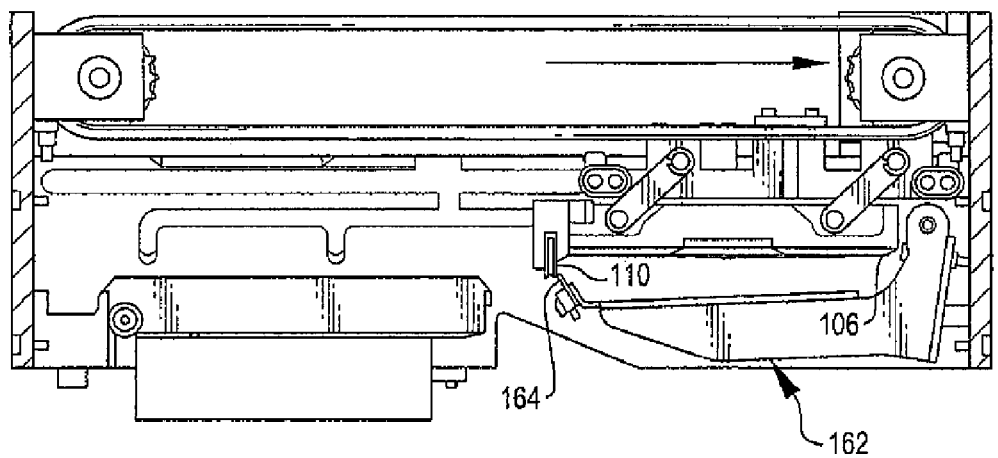

FIGS. 7B and 7C show rightward movement of the shuttle assembly 98 relative to the shuttle assembly's position in FIG. 7A according to an embodiment of the invention.

Figure 8:
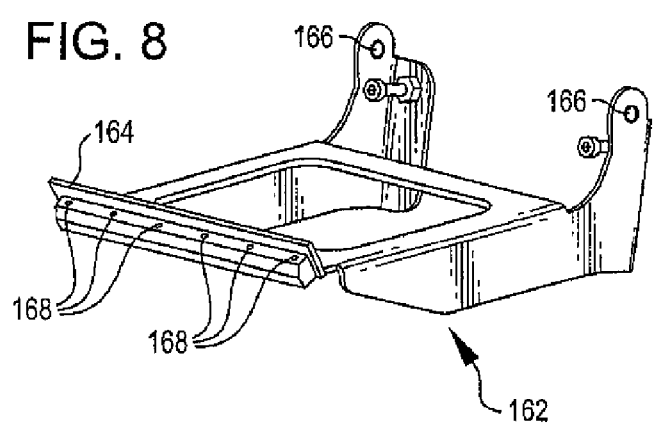
FIG. 8 is an isometric view of the filter and wiper cleaning assembly of FIGS. 7A-7C according to an embodiment of the invention.

FIG. 8 is an isometric view of the cleaning assembly 162 of FIGS. 7A-7C according to an embodiment of the invention. The scraper 164 may be made out of metal, rubber, or any other suitable material, and is disposed over the solid waste disposal unit 56 (FIG. 3). And if the filter 106 (FIGS. 4-7C) is concave, the scraper 164 has the same contour so that it can contact the filter across its entire diameter. In addition to the scraper 164 and the pivots 166, the cleaning assembly 162 may include water jets 168, which are adjacent to the scraper. Although not shown, the water-measuring-and-transporting unit 40 (FIG. 3) may feed to the jets 168 heated water from the reservoir 36 (FIG. 3), or may feed to the jets heated water from the reservoir mixed with cleaning solution from the cleaner-dispensing unit 34 (FIG. 3). Flexible tubing or another type of conduit may connect the water-measuring-and-transporting unit 40 to the water jets 168. Alternatively, the water jets 168 may be fed directly from the tap-water inlet (FIG. 3) or from another water or cleaning-solution source.

Referring to FIGS. 7A-8, the operation of the cleaning assembly 162 is described according to an embodiment of the invention.

The scraper 164 and water (or cleaning solution) discharged from the water jets 168 clean the filter 106 and the wiper 110.

As discussed above in conjunction with FIGS. 6A-6B and as shown in FIG. 7A, after the brewing unit 50 brews coffee, the shuttle-assembly drive 150 moves the shuttle assembly 98 upward and to the right such that the wiper 110 begins sweeping the spent coffee grounds from the surface 92 of the piston 90 into the solid-waste-disposal unit 56.

In addition, the controller 64 (FIG. 3) extends the plunger 160 toward the brewing unit 50 to rotate the cleaning assembly 162 about the pivots 166 such that the top edge of the scraper 164 is substantially coplanar with the underside of the filter 106. The solenoid plunger may be designed to extend no further than the desired position, or a sensor (not shown) may indicate to the controller 64 when the scraper 164 is in the desired position. Alternatively, the plunger may not be a solenoid plunger, but may instead be a spring-loaded plunger that forces the cleaning assembly 162 into the proper position.

Referring to FIG. TB, as the shuttle assembly 98 continues to move rightward, the scraper 164 contacts the underside of the filter 106 and dislodges spent coffee grounds and, if present, other residue (neither shown in FIGS. 7A-7C) that stuck to the underside of the filter as the piston 90 was forcing brewed coffee through the filter. Water (or cleaning solution) discharged from the jets 168 facilitates the dislodging of the spent coffee grounds and residue from the filter 106, and, depending on the jets' spray pattern, may also keep the scraper 164 free of coffee grounds and other residue. Because the scraper 164 and jets 168 are positioned over the solid-waste-disposal unit 56 (FIG. 3), the dirty water, dislodged coffee grounds, and other residue fall into the disposal unit. And if the filter 106 includes a disposable cloth or paper portion on its underside, then the scraper 164 may also remove this portion such that it falls into the disposal unit 56 along with the spent coffee grounds and other residue.

Referring to FIG. 7C, after the filter 106 moves over the scraper 164, the wiper 110 moves over the scraper, which contacts the bottom of the wiper. The scraper 164, together with water (or cleaning solution) discharged from the jets 168, dislodges spent coffee grounds and, if present, other residue stuck to the wiper. As discussed above, because the scraper 164 and the jets 168 are positioned over the solid-waste-disposal unit 56 (FIG. 3), the coffee grounds and other residue dislodged from the wiper 110 fall into the disposal unit. After the wiper 110 moves rightward past the scraper 164, the jets 168 may continue to discharge water to dislodge coffee grounds, and, if present, other residue from the scraper, such that the dirty water and dislodged material fall into the solid-waste-disposal unit 56.

Figure 9:
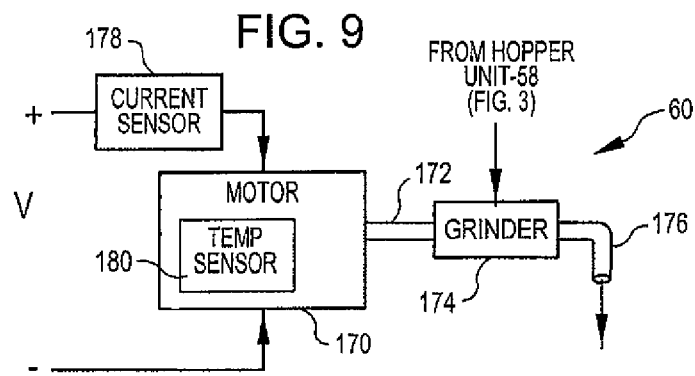
FIG. 9 is a block diagram of the grinding-and-measuring unit of FIG. 3 according to an embodiment of the invention.

FIG. 9 is a block diagram of the grinding-and-measuring unit 60 of FIG. 3 according to an embodiment of the invention.

The grinding-and-measuring unit 60 includes an electric motor 170 that is powered by a supply voltage V and that is responsive the controller 64 (FIG. 3), a shaft 172, a grinder 174, and a discharge port 176. The grinding-and-measuring unit may also include a current sensor 178 or a temperature sensor 180.

The motor 170 drives the grinder 174 via the shaft 172 in response to the controller 64 (FIG. 3).

The grinder 174 may be any suitable device for grinding coffee beans or another substance from which a beverage may be brewed.

The discharge port 176 provides the ground coffee from the grinder 174 to the grind-transporting unit 54 (FIG. 3), or directly to the beverage-brewing unit 50 (FIG. 3) if the brewing machine 30 (FIG. 3) lacks the grind-transporting unit.

The current sensor 178 generates and provides to the controller 64 (FIG. 3) a signal that indicates the amount of current that the motor 172 draws, and the temperature sensor 180 generates and provides to the controller a signal that indicates the temperature of the motor.

In operation, the controller 64 (FIG. 3) determines that the amount of ground coffee discharged from the port 176 equals the product of the grind rate of the grinder 174—the grind rate may be stored in the controller memory 68—and amount of time that the motor 170 is "on". Because the instantaneous grind rate of the grinder 174 may depend on the amount of material that the grinder is grinding, and thus discharging through the port 176, at that instant, the controller 64 may also base the ground-coffee measurement on the current that the motor 170 draws, on the temperature of the motor, or both the current drawn and the temperature. At any one instant, the load on the motor 170 is proportional to the amount of ground coffee that the grinder 176 discharges through the port 176, and the current that the motor draws is proportional to the load. Therefore, the higher that rate at which the grinder 174 discharges ground coffee through the port 176, the higher the load on the motor 170, and thus the higher the current that the motor draws. Furthermore, the grind rate is proportional to the motor efficiency, which is typically inversely proportional to the motor temperature. Therefore, the higher the temperature of the motor 170, the smaller the amount of ground coffee that the grinder 174 is discharging through the port 176. Consequently, the controller 64 can measure the amount of coffee discharged from the port 176 by monitoring the signals from the current and temperature sensors 178 and 180 and applying an algorithm that relates the values of these signals to the rate at which the grinder 174 discharges ground coffee through the port 176. Alternatively, the grinding and measuring unit 60 may omit one or both of the current and temperature sensors 178 and 180, and the controller 64 may measure the amount of ground coffee discharged from the port 176 by monitoring only the signal from the included one of the current and temperature sensors (if one is included).

When the controller 64 (FIG. 3) determines that the grinder 174 has generated and discharged through the port 176 a predetermined amount of ground coffee, the controller deactivates the motor 170.

Figure 10:
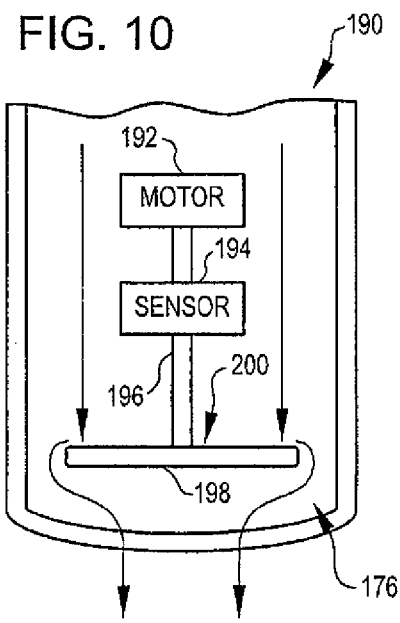
FIG. 10 is a cut-away side view of the measuring assembly of the grinding-and-measuring unit of FIG. 9 according to another embodiment of the invention.

FIG. 10 is a side view with portions broken away of a ground-coffee measuring assembly 190 of the grinding-and-measuring unit 60 of FIG. 3 according to another embodiment of the invention, where like numbers reference components common to FIGS. 9-10. The assembly 190 can replace or supplement the controller's calculation of the amount of ground coffee discharged via the discharge port 176 based on the grind rate of the grinder 174 (FIG. 9) and the signals from none, one, or both of the current and temperature sensors 178 and 180 of FIG. 3, and is disposed within the discharge port. Alternatively, the assembly 190 may be disposed in another suitable location within the grinding-and-measuring unit 60.

The assembly 190 includes a motor 192, a speed sensor 194, a shaft 196, and a disk 198 having an upper surface 200.

The motor 192 is an electric or other suitable motor that is separate from the grinder motor 170 (FIG. 9) and that spins the shaft 196 and the disk 198 at a substantially constant speed when the disk is able to rotate freely, i.e., when nothing, such as ground coffee, impedes the rotation of the disk.

The speed sensor 194 generates a signal that indicates the rotational speed of the disk 198, and provides this signal to the controller 64 (FIG. 3).

The disk 198 is substantially flat, relatively lightweight, and is formed from plastic or another suitable material. Furthermore, the disk 198 may have holes (not shown in FIG. 10) sufficiently wide to pass coffee grounds.

In operation, the controller 64 (FIG. 3) measures the amount of ground coffee (indicated by the arrows) discharged from the port 176 based on the rotational speed of the disk 198. As ground coffee (indicated by the arrows) flows from the coffee grinder 174 (FIG. 9) to the port 176, the ground coffee collects on the upper surface 200 of the disk 198 before flowing over the sides (through the holes) of the disk and through the port as indicated by the arrows. Because the ground coffee collected on the surface 200 has a mass, it effectively changes the disk's rotational moment of inertia by an amount proportional to the mass of collected coffee. This change in the disk's moment of inertia changes the speed at which the disk 198 spins by an amount proportional to the change in the moment of inertia. The controller 64 monitors the speed of the disk 198 via the signal generated by the sensor 194. Consequently, by integrating the speed of the disk 198 with respect to time, the controller 64 can use an algorithm that relates the integrated disk speed to the amount of ground coffee that collects on the disk surface 200 over time to determine the amount of ground coffee discharged from the port 176.

Furthermore, the controller 64 (FIG. 3) may use any of the above-described measuring techniques to "learn" a more accurate algorithm for determining the amount of ground coffee based on grind rate of the grinder 174 (FIG. 9). That is, the controller can calculate the amount of ground coffee that the grinder 174 generates in two ways: 1) based on a predetermined grind rate multiplied by the "on" time of the grind motor 170 (FIG. 9) and none, one, or both of the motor temperature and current draw as described above in conjunction with FIG. 9; and, 2) using the disk 198. Because the second calculation may be more accurate than the first, the controller 64 compares the results yielded by both calculations, and then adjusts the algorithm for the first calculation so that it yields a new result that is closer or equal to the result yielded by the second calculation. This "learning", which the controller 64 may accomplish using known neural-network or other techniques, may allow the controller 64 to accurately measure the amount of discharged ground coffee if, e.g., the assembly 190 fails.

When the controller 64 (FIG. 3) determines that the port 176 has discharged a predetermined amount of ground coffee, the controller deactivates the grinder motor 170 (FIG. 3) and the motor 192.

Figure 11:
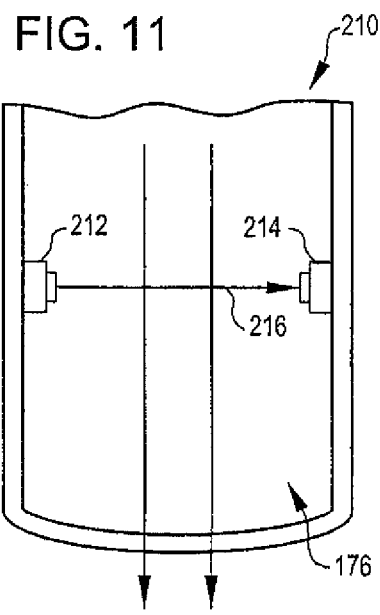
FIG. 11 is a cut-away side view of the measuring assembly of the grinding-and-measuring unit of FIG. 9 according to yet another embodiment of the invention.

FIG. 11 is a side view with portions broken away of a ground-coffee measuring assembly 210 of the grinding-and-measuring unit 60 of FIG. 3 according to another embodiment of the invention, where like numbers are used to reference components common to FIGS. 9-11. The assembly 210 can replace or supplement the controller's calculation of the amount of ground coffee discharged via the port 176 based on the grind rate of the grinder 174 (FIG. 9) and the signals from none, one, or both of the current and temperature sensors 178 and 180 of FIG. 9; and, like the assembly 190 of FIG. 10, the assembly 210 is disposed within the discharge port 176. Alternatively, the assembly 210 may be disposed in another suitable location within the grinding-and-measuring unit 60.

The assembly 210 includes an emitter 212 and a sensor 214. The emitter 212 emits a beam 216 of electromagnetic energy such as light to the sensor 214, which detects the intensity of the beam, generates a signal that indicates the intensity of the beam, and provides this signal to the controller 64 (FIG. 3). For example, the emitter 212 may be a light-emitting diode (LED), or a laser diode, and the sensor 214 may be a photo detector.

In operation, the controller 64 (FIG. 3) measures the amount of ground coffee discharged from the port 176 based on the intensity of the beam 216 detected by the sensor 214. As ground coffee (indicated by the arrows) flows from the coffee grinder 174 (FIG. 9) to the port 176, at least some of the ground coffee passes through the beam 216. The more ground coffee passing through the beam 216 at any instant, the smaller the portion of the beam that strikes the sensor 214, and thus the lower the beam intensity detected by the sensor. The controller 64 monitors the intensity of the beam 216 via the signal generated by the sensor 214. Consequently, by integrating the intensity of the beam 216 with respect to time, the controller 64 can use an algorithm that relates the integrated intensity to the amount of ground coffee that passes through the beam over time to determine the amount of ground coffee discharged from the port 176.

Furthermore, the controller 64 may use the above-described measuring technique to "learn" a more accurate algorithm for determining the amount of ground coffee based on the grind rate of the grinder 174 (FIG. 9) as described above in conjunction with FIG. 10.

When the controller 64 (FIG. 3) determines that the port 176 has discharged a predetermined amount of ground coffee, the controller deactivates the grinding motor 170 (FIG. 3).

Moreover, in another implementation of the assembly 210, the emitter 212 is replaced with a combination emitter and detector, and the sensor 214 is replaced with a reflector. Therefore, the emitter/detector 212 emits the beam 216, the reflector 214 reflects the beam, and the emitter/detector detects the intensity of the reflected beam. The controller 64

(FIG. 3) measures the amount of ground coffee discharged through the port 176 based on the intensity of the reflected beam as described above.

Figure 12:
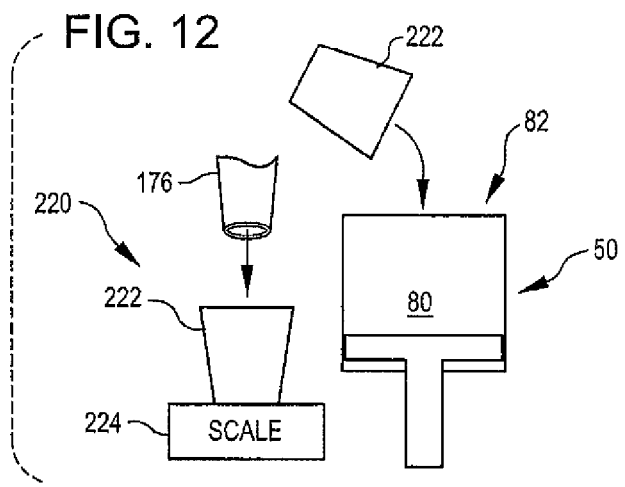
FIG. 12 is a block diagram of the brewing chamber of FIG. 4 and the measuring assembly of the grinding-and-measuring unit of FIG. 9 according to still another embodiment of the invention.

FIG. 12 is a diagram of the beverage-brewing unit 50 and a ground-coffee measuring assembly 220 of the grinding and measuring unit 60 of FIG. 3 according to another embodiment of the invention, where like numbers are used to reference components common to FIGS. 9-12. The assembly 220 can replace or supplement the controller's calculation of the amount of ground coffee discharged via the port 176 based on the grind rate of the grinder 174 (FIG. 9) and the signals from none, one, or both of the current and temperature sensors 178 and 180 of FIG. 9, and is disposed external to the discharge port 176. Alternatively, the assembly 220 may be disposed in another suitable location within the grinding-and-measuring unit 60. Furthermore, although for purposes of explanation the assembly 220 is shown transporting ground coffee directly to the brewing chamber 80, the assembly 220 transports the ground coffee to the ground-transporting unit 54 (FIG. 3) where the brewing machine 30 (FIG. 3) includes the ground-transporting unit. Alternatively, the assembly 220 may compose all or part of the ground-transporting unit 54.

The assembly 220 includes a measuring, i.e., dosing, cup 222, a scale 224, and a cup drive assembly (the operation of which is indicated by the dashed line in FIG. 12). The dosing cup 222 is kinematically decoupled from the cup drive assembly when the cup is on the scale 224. "Kinematically decoupled" means that the drive assembly exerts no force on the cup 222, so that the weight indicated by the scale 224 is not corrupted by the drive assembly.

The dosing cup 222 receives ground coffee (represented by the solid line arrow) discharged from the port 176, and the scale 224 weighs the ground coffee and the cup and provides to the controller 64 (FIG. 3) a signal that indicates this weight. Because the scale 224 may be sensitive to vibrations caused by the beverage-brewing machine 30 (FIG. 3) or present in the environment in which the machine is located, the scale may weigh the ground coffee and cup multiple times, and the controller 64 may determine the weight of the ground coffee and cup to be the average of these multiple weights. For example, when the measured weight is close to the desired weight, the controller 64 may turn off the grinder motor 170 (FIG. 9) to eliminate the vibrations therefrom, measure the weight of the cup 222 and coffee inside, and repeat this sequence until the desired amount of ground coffee is in the cup.

The cup drive assembly (represented by the dashed line) moves the cup 222 from the scale 224 to the opening 82 of the brewing chamber 80, and tips the cup such that the ground coffee falls from the cup into the brewing chamber. The drive assembly may also "bang" the cup 222 to dislodge into the brewing chamber 80 ground coffee that is stuck to the bottom or sides of the cup.

In operation, the controller 64 (FIG. 3) determines from the signal (or multiple signals per above) generated by the scale 224 the weight of ground coffee discharged from the port 176. Ground coffee (indicated by the arrows) exits the port 176 and enters the cup 222. The scale 224 weighs the cup 222 and the ground coffee in the cup, and, as discussed above, generates one or more signals that each represent the combined weight of the coffee and the cup. The controller 64 monitors the combined weight of the coffee and the cup via the one or more signals generated by the scale 224. From the combined weight of the ground coffee and the cup 222, the controller 64 determines the weight of the coffee by subtracting from the combined weight the known weight of the cup, which may be determined beforehand and stored in the memory 68 (FIG. 3).

To prevent overfilling of the cup 222, the controller 64 may stop the grinder motor 170 (FIG. 9) when the weight of the ground coffee in the cup is below the desired weight, and then weigh the coffee, pulse the motor, and repeat this sequence one or more times until the desired weight of ground coffee is in the cup.

When the controller 64 (FIG. 3) determines that the port 176 has discharged a predetermined weight of ground coffee into the cup 222, the controller deactivates the grinding motor 170 (FIG. 9) and causes the cup drive assembly (represented by the dashed line) to dump the ground coffee in the cup 222 into the brewing chamber 180. Then the controller 64 causes the cup 222 to return to its "home" position on the scale 224.

FIGS. 13-18 illustrate the operation of the beverage-brewing machine 30 of FIG. 3 during a beverage-brewing cycle according to an embodiment of the invention, where like numbers reference components common to FIGS. 3-18. For clarity of explanation, FIGS. 13-18 omit some features discussed above in conjunction with FIGS. 3-12, it being understood that these features may be present even though they are not shown or discussed. For example, although FIGS. 13-18 do not show the linkage members 126 and 128 and track guides 130, 132, 134, 135, and 137, (FIGS. 5-7C) of the shuttle assembly 98, the shuttle assembly may include these linkage members and track guides. Furthermore, although it may not be explicitly stated, the controller 64 may control one or more of the below-described steps. Moreover, although the operation of the machine 30 is described for brewing coffee, the operation for brewing another beverage, such as tea, may be the same as or similar to the described operation.

Referring to FIGS. 3 and 13-18, the operation of the beverage brewing machine 30 during a beverage-brewing cycle is discussed according to an embodiment of the invention.

Figure 13:
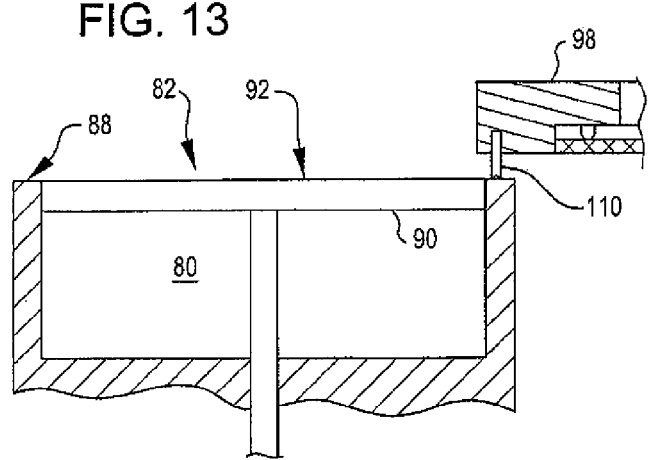
FIGS. 13-18 illustrate a brewing cycle of the beverage-brewing machine of FIG. 3 according to an embodiment of the invention.

Referring to FIG. 13, after a human operator (not shown in FIGS. 3 and 13-18) activates the machine 30 by, e.g., turning "on" a power switch (not shown in FIGS. 3 and 13-18), the machine 30 performs a self-check/initialization during which the piston 90 and shuttle assembly 98 move into respective "home" positions if they are not already in their respective home positions. For example, the piston 90 moves into a position where the piston surface 92 is substantially coplanar with the block surface 88, and the shuttle assembly 98 moves into a position in which the opening 82 of the brew chamber 80 is partially or fully exposed. Alternatively, the piston 90 and shuttle assembly 98 may already be in their respective home positions from the last brew cycle, or may move into any other respective non-home positions that are suitable for starting the brew cycle.

Next, the operator enters a coffee selection (if multiple coffees are available), a beverage size (e.g., 8 ounces, 16 ounces), and one or more brewing parameters (e.g., grind size, ground-coffee-to-water ratio, water temperature, and brew time) via the control panel 70. For example, if the hopper unit 58 holds two or more roasts of coffee beans, then the operator may select a desired roast by name or by another identifier, such as the name or number of the hopper (not shown in FIGS. 3 and 13-18) holding the beans of the desired roast. Furthermore, the machine 30 may allow the operator to enter a custom beverage size (e.g., 9 ounces, 11 ounces), or may constrain the operator to one or more predetermined sizes (e.g., 8 ounces, 16 ounces). Moreover, the operator may enter each brewing parameter separately, or may enter an identifier, such as the name of the selected roast, to select a set of predetermined brew parameters that are stored in the memory 68 and associated with the identifier. Alternatively, the present operator, another operator, or the machine 30 (via, e.g., the Internet or RFID tag) may have already entered the brewing parameters when the coffee beans were loaded into the hopper. If the operator enters the brew parameters separately, but fails to enter one or more required parameters, then the machine 30 may assign a default value to each of the parameters not entered. And if the operator enters a set of brewing parameters via an identifier he may alter one or more of these pre-programmed parameters either directly or abstractly. An example of the later is where the operator selects an "abstract" brew strength (e.g., weak, normal, strong) that the controller 64 converts into an actual coffee-to-water ratio in a pre-programmed manner. In addition, the machine 30 may, via the display 70, remind the operator to place a cup in the cup holder 44.

Figure 14:
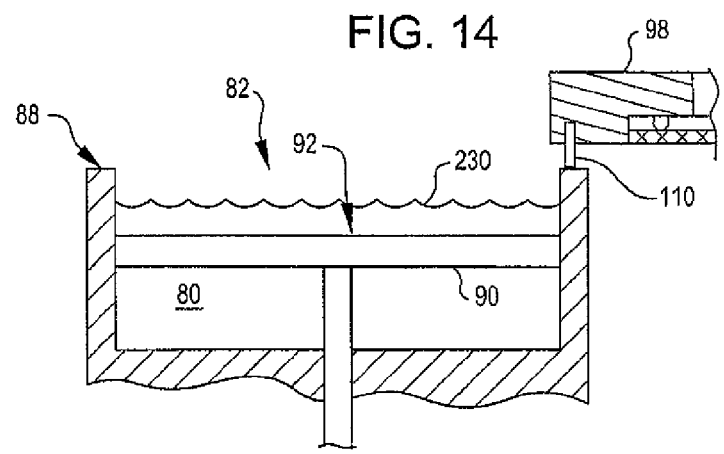

Then, referring to FIG. 14, the piston 90 retracts a predetermined distance to leave enough room in the chamber 80 for receiving ground coffee 230. Alternatively, if the home position of the piston 90 leaves sufficient room in the chamber 80, then the piston need not retract.

Next, the grinding-and-measuring unit 60 and, if present, the grind-transporting unit 54, load the brewing chamber 80 with a predetermined amount of the ground coffee 230. If the grinding-and-measuring unit 60 can provide different grind sizes (e.g., coarse, fine), then the unit generates the ground coffee 230 having the selected grind size. Alternatively, the unit 60 may provide different portions of the ground coffee 230 having different grind sizes. For example, the unit 60 may provide an intermediate grind consistency by finely grinding the first half of the ground coffee 230 and coarsely grinding the second half of the ground coffee. Furthermore, because the grind size may affect the grind rate of the grinder 174 (FIG. 9), the controller 64 may take into account the grind size when measuring the ground coffee 230, particularly when using the (grind rate)×(grinding time) measuring technique described above in conjunction with FIG. 9.

Figure 15:
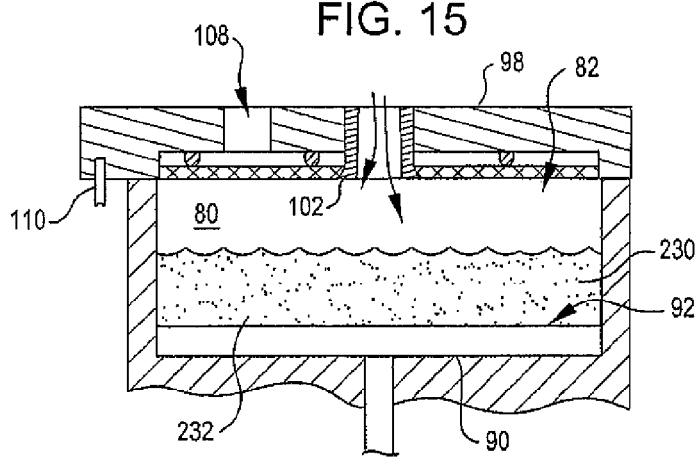

Referring to FIG. 15, after the grinding-and-measuring unit 60, and, if present, the grind-transporting unit 54, load the ground coffee 230 into the chamber 80, the shuttle assembly 98 seals the opening 82 of the brewing chamber 80 as described above in conjunction with FIGS. 6A-6B.

While the grinding-and-measuring and grind-transporting units 60 and 54 are loading the ground coffee 230 into the chamber 80 and while the shuttle assembly 98 is sealing the chamber, the water-reservoir-and-heating unit 36 is heating the water to a predetermined temperature if the water is not already at this temperature. In one example, the unit 36 heats the water above the desired brewing temperature so that the water-temperature-control unit 38 can provide to the chamber 80 water at the desired brewing temperature by cooling the heated water from the reservoir with cold tap water as described above in conjunction with FIG. 3. In another example, the reservoir-and-heating unit 36 heats the water to the brewing temperature, and the temperature-control unit 38 is inactive or omitted. Either technique allows control of the brewing temperature from cup to cup.

Next, the water-measuring-and-transporting unit 40 fills the sealed brewing chamber 80 with a desired amount of water 232 having the desired brewing temperature via the nozzle 102. In one example, the water-and-measuring unit 40 includes a pump that forces the desired amount of water 232 through the nozzle 102. In another example, the water-measuring-and-transporting unit 40 lacks a pump, and the water 232 is gravity fed from the reservoir unit 36 to the nozzle 102 via the water-measuring-and-transporting unit. In these two techniques, the beverage-transporting unit 48 may open the outlet 108 to allow air in the chamber 80 to escape via the outlet as the water 232 enters the chamber. In yet another example, the outlet 108 is closed and the piston 90 retracts to create a suction that draws the water 232 from the reservoir 36 into the chamber 80 via the measuring-and-transporting unit 40 and the nozzle 102. In still another example, a combination of the pump and piston suction is used to fill the chamber 80 with water.

Still referring to FIG. 15, techniques for measuring the water that the water-measuring-and-transporting unit 40 provides to the brewing chamber 80 are discussed. In one implementation, the unit 40 includes a solenoid pump, which pumps water at a highly consistent rate. Therefore, the controller 64 determines the amount of water that the unit 40 provides to the brewing chamber 80 as being equal to the product of the pump rate and the amount of time that the pump is active. Because the pump rate may vary with the pressure and temperature of the water from the temperature-control unit 38, the temperature-control unit or the water-transporting unit 40 may include sensors to indicate the pressure and temperature of the water, and the controller 64 may take into account the pressure or temperature when measuring the amount of water 232 provided to the brewing chamber 80.

And in an implementation where the piston 90 draws in the water 232 by retracting, then the controller 64 may measure the amount of water that enters the chamber 80 by measuring the distance that the piston 90 retracts, and using an algorithm to relate the distance retracted to the amount of water drawn. Because the amount of water that the piston 90 draws into the chamber 80 may depend on the temperature of the water and the temperature and pressure of the gas in the chamber and in other parts of the machine 30, the machine may include temperature and pressure sensors in these parts of the machine, and the controller 64 may take into account these temperatures and pressures when measuring the amount of water 232 drawn into the chamber.

In still another example, the water 232 enters the chamber 80 or is measured using a combination or sub-combination of the above-described techniques.

In a related implementation, the controller 64 adjusts the amount of water 232 introduced to the chamber 80 based on the amount of ground coffee 230 introduced to the chamber. This maintains, the coffee-to-water ratio, which is one of the brewing parameters that significantly affects taste, more accurate from cup to cup. The error in the ground-coffee-to-water ratio is the sum of the water-measurement error and the coffee-measurement error. To reduce the ratio error, the controller 64 can adjust the amount of one of the ground coffee 230 and water 232 based on the measurement of the other. Because the water measurement is typically more accurate than the coffee measurement, the controller 64 adjusts the amount of water based on the measured amount of ground coffee 230 in the chamber 80. For example, assume that the coffee-to-water ratio is 3 grams/ounce, so a 10-ounce cup of coffee calls for 30 grams of ground coffee and 10 ounces of water. However, suppose that the controller 64 determines that 33 grams of coffee were introduced into the chamber 80. To maintain the 3/1 ratio, the controller 64 causes the water-measuring- and transportation unit 40 to introduce 11 ounces of water into the cylinder. The machine 30 can then discard one ounce of the brewed coffee via the liquid-waste disposal unit 42 as further described below in conjunction with the discussion of "silt" so that only the desired 10 ounces of coffee fill the operator's coffee cup (not shown in FIGS. 3 and 13-18). Although the coffee-to-water ratio may still be off due to errors in measuring the coffee 230 and water 232, the ratio is typically more accurate than it would have been had the amount of water not been adjusted as described above. The controller 64 may use this technique when too little coffee 230 is in the chamber 80 by introducing less water into the chamber, although this will result in less than the selected amount of coffee in the operator's cup. Alternatively, the controller 64 may cause the grinder 174 (FIG. 9) to grind some additional coffee.

Still referring to FIG. 15, after the desired amounts of ground coffee 230 and water 232 are in the chamber 80, the machine 30 agitates the mixture of the ground coffee and the water to thoroughly wet the ground coffee. In one example, the spray pattern from the nozzle 102 performs this agitation while the water 232 is entering the chamber 80. To enhance the agitation, the water 232 may enter the chamber 80 in multiple bursts. In another example, a mechanical member (not shown in FIGS. 3 and 13-17) performs the agitation while the water 232 is entering the chamber 80, after the water enters the chamber, or both while and after the water enters the chamber. In yet another example, both the nozzle 102 and the mechanical member perform the agitation.

Next, the mixture of the ground coffee 230 and the water 232 remains in the chamber 80 for the selected brewing time. During the brewing time, the brewing unit 50 may heat or cool the mixture within the chamber 80 as discussed above in conjunction with FIG. 4.

Then, the cup sensing unit 52 indicates whether a cup (not shown in FIGS. 3 and 13-18) is in the holder 44. If a cup is not in the holder, then the controller 64 halts the brewing cycle, and may sound an audio or visual alarm, until the operator places a cup in the holder 44. If a cup is in the holder 44, then the brewing cycle continues as described below.

Figure 16:
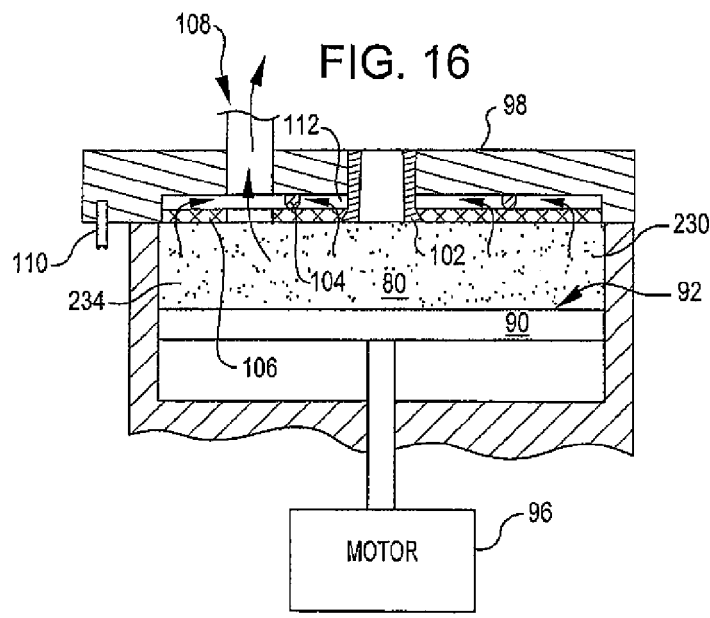

Referring to FIG. 16, after the brewing time has expired, the piston 90 extends to expel the brewed coffee 234 from the chamber 80 and into a coffee cup (not shown in FIGS. 3 and 13-18) in the cup holder 44 via the beverage-transporting and -dispensing units 48 and 46. The piston 90 forces the brewed coffee 234 through the filter 106, into the space 112, and through the outlet 108 to the beverage transporting unit 48. In one implementation, the piston 90 extends in multiple steps to allow the spent coffee grounds 230 to settle on the surface 92 of the piston. In another implementation, a pressure sensor (not shown in FIGS. 3 and 13-18) is located within the brewing chamber 80, and the controller 64 controls the extension speed of the piston 90 in a closed-loop manner to maintain the pressure within the brewing chamber 80 at a desired level that prevents damage to, e.g., the filter 106 and the seal between the shuttle assembly 98 and the brewing chamber.

Still referring to FIG. 16, sometimes "silt" or other undesirable debris (not shown in FIGS. 3 and 13-18) that are too fine to be retained in the brewing chamber 80 by the filter 106 float near or to the top of the brewed coffee 234. To keep this debris out of the coffee cup (not shown in FIGS. 3 and 13-18), before the piston 90 begins to extend the beverage-transporting unit 48 closes and the water-transporting unit 40 opens. Therefore, as the piston 90 extends, a predetermined amount of the brewed coffee 234 including the debris is expelled into the liquid-disposal unit 42. After the piston 90 expels the predetermined amount of brewed coffee 234 into the disposal unit 42, the beverage-transporting unit 48 opens and the water-transporting unit 40 closes such that the extending piston expels the remaining, and substantially debris free, brewed coffee 234 to the beverage-dispensing unit 46. The controller 64 may cause the piston 90 to expel the desired amount of brewed coffee 234 into the disposal unit 42 by measuring the distance that the piston extends, and using an algorithm to determine the amount of brewed coffee expelled based on the distance that the piston extends (this algorithm may be the same as or similar to the one used to determine the amount of water drawn into the chamber 80 by the retracting piston 90 as described above). Furthermore, the controller 64 may introduce additional ground coffee 230 and water 232 into the chamber 80 to compensate for the debris-removal step. For example, if the operator wants an 8 ounce cup of coffee brewed with 24 grams of ground coffee (a 3 gram to 1 ounce ratio), then the controller 64 may introduce 27 grams of ground coffee 230 and 9 ounces of water 232 into the chamber 80. This maintains the desired coffee-to-water ratio and cup size while allowing the piston 90 to expel 1 ounce of debris-ridden brewed coffee 234 into the liquid-waste disposal unit 42.

Figure 17:
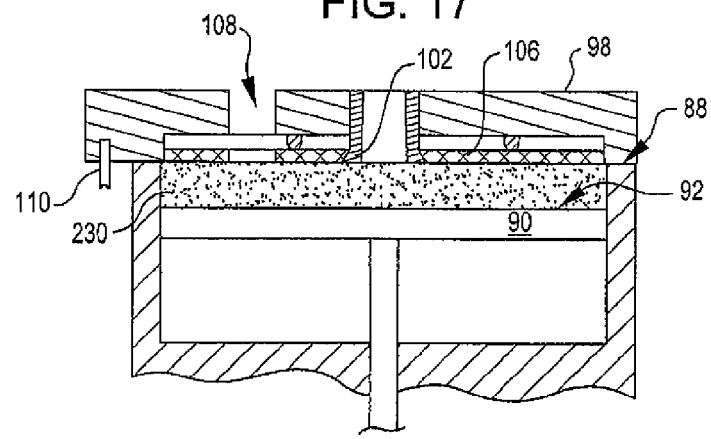

Referring to FIG. 17, the piston 90 stops extending and expelling the brewed coffee 234 (not shown in FIG. 17) when the piston surface 92 is a predetermined distance below the block surface 88. This predetermined distance is sufficient to prevent the spent coffee grounds 234 from pressing against the filter 106 with a force sufficient to damage the filter, the seal between the chamber 80 and the shuttle assembly 98, or other components of the shuttle assembly.

Then, the controller 64 may indicate to the operator via the display 70 or other indicator (not shown in FIGS. 3 and 13-18) that he may remove the coffee-filled cup (not shown in FIGS. 3 and 13-18) from the cup holder 44.

Figure 18:
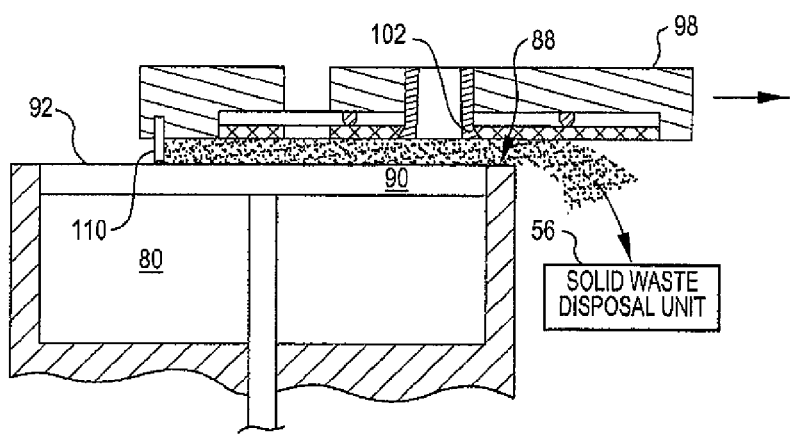

Referring to FIG. 18, the shuttle assembly 98 next moves upward and away from the chamber 80, and the piston 90 extends until the piston surface 92 is substantially coplanar with the block surface 88.

Next, the shuttle assembly 98 moves rightward such that the wiper 110 sweeps the spent coffee grounds 230 from the piston 90 and into the solid waste disposal unit 56.

Still referring to FIGS. 3 and 13-18, other embodiments of the above-described brewing cycle are contemplated. For example, the order of the above-described steps may be altered, the steps described as being performed concurrently may be performed at different times, and steps described as being performed at different times may be performed concurrently. Furthermore, some of the steps may be omitted.

Referring to FIGS. 3 and 16, the operation of the beverage-brewing machine 30 during a cleaning cycle is described according to an embodiment of the invention. Although not specifically discussed, some or all of the techniques discussed above in conjunction with the brewing cycle of FIGS. 13-18 may perform or be modified to perform the same or similar functions during the cleaning cycle.

After an operator (not shown in FIGS. 3 and 16) activates the machine 30 by, e.g., turning "on" a power switch (not shown in FIGS. 3 and 16), he may initiate a cleaning cycle via the control panel 70, or the machine may initiate the cleaning cycle automatically. For example, the machine 30 may automatically initiate the cleaning cycle at a predetermined time each day.

Next, the shuttle assembly 98 seals the brewing chamber 80.

While the shuttle assembly 98 is sealing the chamber 80, the water reservoir and heating unit 36 heats the water to a predetermined temperature if the water is not already at this temperature. In one example, the unit 36 heats the water above the desired cleaning temperature so that the water temperature control unit 38 can provide to the chamber 80 water at the desired cleaning temperature by cooling the heated water with cold tap water. In another example, the reservoir-and-heating unit 36 heats the water to the cleaning temperature, and the temperature-control unit 38 is inactive or omitted.

Then, the water-and-cleaner-measuring-and-transporting unit 40 fills the sealed brewing chamber 80 via the nozzle 102 with a mixture comprising a predetermined amount of water and cleaning solution (e.g., vinegar) from the cleaner dispensing unit 34. The unit 40 may measure the mixture using the same techniques and components used to measure the water during a brewing cycle as discussed above in conjunction with FIGS. 13-18. For example, the cleaning dispenser 34 may provide a steady flow of cleaning solution to the transporting unit 40, which provides a predetermined amount of water to the chamber 80. Because the unit 34 dispenses the cleaning solution at a known rate, the amount of cleaning solution dispensed is proportional to the amount of water that the transporting unit 40 provides to the chamber 80. Furthermore, while the cleaning mixture enters the chamber 80, the beverage-transporting unit 48 may open the outlet 108 to allow air in the chamber to escape. In another implementation, the outlet 108 is closed and the piston 90 retracts to creating a suction that draws the mixture of water and cleaning solution into the chamber 80 via the measuring-and-transporting unit 40 and the nozzle 102. With this technique, the controller 64 can measure the amount of cleaning mixture that enters the chamber 80 using the same techniques to measure drawn-in water as discussed above in conjunction with FIGS. 13-18. In yet another implementation, the water-and-cleaner mixture enters the chamber 80 using a combination or sub-combination of the above-described techniques. In still another implementation, the operator may pour the cleaning solution into the chamber 80 via the chamber opening 82.

Next, the machine 30 agitates the mixture of the cleaning solution and water. In one implementation, the spray pattern from the nozzle 102 performs this agitation while the mixture is entering the chamber 80. To enhance the agitation and cleaning of the chamber 80, the mixture may enter the chamber in multiple bursts. In another example, a mechanical member (not shown in FIGS. 3 and 16) performs the agitation while the mixture is entering the chamber 80, after the mixture enters the chamber, or both while and after the mixture enters the chamber. In yet another example, both the nozzle 102 and the mechanical member agitate the cleaning mixture.

Then, the cleaning mixture remains in the chamber 80 for a predetermined cleaning time, during which the piston 90 may move up or down to enhance the cleaning of the chamber 80 and the piston.

After the cleaning time has expired, the cup sensing unit 52 indicates to the controller 64 whether a cup is in the cup holder 44. If a cup is present, then the controller 64 halts the cleaning cycle and may sound an audible or visible alarm until the cup is removed from the holder.

if the cup sensing unit 52 indicates that no cup is in the cup holder 44, the piston 90 extends to expel the cleaning mixture from the chamber 80 and into the drain unit 44 via the beverage-transporting-and-dispensing units 48 and 46. The piston 90 forces the cleaning mixture through the filter 106, into the space 112, and through the outlet 108 to the beverage-transporting unit 48. The cleaning mixture cleans the filter 106, the space 112, the outlet 106, the beverage-transporting-and-dispensing units 48 and 46, the cup-holder-and-drain unit 44, and the conduits connecting these components as the mixture passes through.

The piston 90 stops extending and expelling the cleaning mixture when the piston surface 92 is substantially coplanar with the block surface 88.

Next, the machine 30 repeats the above-described cycle one or more times with water only to rinse the cleaned components and conduits.

Then, the shuttle assembly 98 disengages the chamber 80 in preparation of the next brewing cycle.

Still referring to FIGS. 3 and 16, other embodiments of the cleaning cycle are contemplated. For example, instead of mixing cleaning solution with water, the cleaner-measuring unit 40 may provide straight (i.e., unmixed with water) cleaning solution from the dispenser 34 to the brewing chamber 80. Furthermore, the order of the above-described steps may be altered, the steps described as being performed concurrently may be performed at different times, and steps described as being performed at different times may be performed concurrently. Moreover, some of the steps may be omitted.

FIG. 19 is a perspective view of the machine 30 according to an embodiment of the invention.

Referring to FIGS. 3 and 19, in addition to the cup-holder-and-drain unit 44 and the control panel and display 70, the machine 30 includes a stainless steel and plastic housing 240, hoppers 242 and 244, a beverage dispensing spout 246, a tray 248, and three doors or panels 250, 252, and 254. Each of the hoppers 242 and 244, which are part of the hopper unit 58, can hold the same or different types of coffee beans. The dispensing spout 246 is part of the beverage-dispensing unit 48, and the tray 248, which is removable for cleaning, is part of the cup-holder-and-drain unit 44. The door/panel 250 allows access for emptying or servicing the solid-waste-disposal unit 56, and the door/panel 252 allows access for servicing some or all of the components above the barrier 62 in FIG. 3. The door/panel 254 allows access for servicing the printed circuit board (not shown in FIGS. 3 and 19) on which the processor 66, memory 68, communications port 72, and perhaps other electronic components are located. The height of the machine 30 is 18 inches or less so that the machine can fit on a counter top under standard-height cabinets (neither shown in FIG. 19). Because this height may be too small to allow water from the reservoir unit 36 to gravity feed into the brewing chamber 80 (not shown in FIGS. 3 and 19), the water-transporting unit 40 may include a pump, or the piston 90 may retract to draw water into the brewing chamber as described above in conjunction with FIGS. 13-18.

From the foregoing it will be appreciated that, although specific embodiments have been described herein for purposes of illustration, various modifications may be made without deviating from the spirit and scope of the invention. Furthermore, where an alternative is disclosed for a particular embodiment, this alternative may also apply to other embodiments even if not specifically stated.

What is claimed is:

1. A machine for brewing coffee, the machine comprising:
a brew chamber having an opening operable to receive ground coffee;
a reservoir operable to hold water, to heat the water to a first predetermined temperature, and to provide heated water to the brew chamber;
a temperature control unit disposed between the reservoir and the brew chamber and operable to cool the water from the reservoir to a second predetermined temperature;
a filter;
a piston disposed in the chamber and operable to force brewed coffee out of the chamber through the filter; and
a wiper operable to sweep the ground coffee off of the piston after the piston forces the brewed coffee out of the chamber.

2. The machine of claim 1, further comprising:
a hopper operable to store coffee beans; and
a grinding-and-measuring unit operable to receive coffee beans from the hopper, to grind the beans into ground coffee, and to introduce a predetermined amount of ground coffee into the brew chamber.

3. The machine of claim 2, wherein the grinding and measuring unit comprises an optical sensor operable to indicate an amount of ground coffee that the unit introduces to the brew chamber.

4. The machine of claim 2, wherein the grinding and measuring unit comprises an ultrasonic sensor operable to indicate an amount of ground coffee that the unit introduces to the brew chamber.

5. The machine of claim 2, wherein the grinding and measuring unit comprises a disk operable to indicate an amount of ground coffee that the unit introduces to the brew chamber.

6. The machine of claim 2, wherein the grinding and measuring unit comprises:
a grinding motor; and
a current sensor operable to indicate an amount of ground coffee that the unit introduces to the brew chamber based on a current drawn by the grinding motor.

7. The machine of claim 2, wherein the grinding and measuring unit comprises:
a grinding motor; and
a temperature sensor operable to indicate an amount of ground coffee that the unit introduces to the brew chamber based on a temperature of the grinding motor.

8. The machine of claim 2, wherein the grinding-and-measuring unit comprises:
a container operable to hold the ground coffee;
a mass sensor operable to indicate a mass of the ground coffee held in the container; and
a mechanism to dump the ground coffee in the container into the brew chamber.

9. The machine of claim 2, wherein the grinding-and-measuring unit comprises:
a container operable to hold ground coffee; and
a mechanism to dump the ground coffee in the container into the brew chamber.

10. The machine of claim 2, wherein the grinding-and-measuring unit comprises:
a container operable to hold ground coffee; and
a mass sensor operable to indicate a mass of the ground coffee held in the container.

11. The machine of claim 1, further comprising a water transporting unit disposed between the reservoir and the brew chamber and operable to receive heated water from the reservoir and to introduce a predetermined amount of the heated water into the chamber via the opening.

12. The machine of claim 1, further comprising a water transporting unit disposed between the reservoir and the brew chamber and operable to receive heated water from the reservoir and to introduce a predetermined amount of the heated water into the chamber via the opening, wherein the water transporting and measuring unit comprises a pump that introduces the water into the brew chamber at a rate that is proportional to a time during which the pump is active.

13. The machine of claim 1 wherein the piston is operable to draw a predetermined amount of heated water from the reservoir into the chamber by moving a distance that corresponds to the predetermined amount.

14. The machine of claim 1 wherein:
the filter is operable to cover the opening of the brew chamber; and
the piston is operable to force the brewed coffee out of the chamber via the opening and through the filter.

15. The machine of claim 1, wherein the wiper and the filter are attached to a common assembly.

16. The machine of claim 1, further comprising an electronic controller operable to control operation of a grinding and measuring unit, the reservoir, a water transporting unit, the piston, and the wiper.

17. The machine of claim 1, further comprising:
a substantially flat surface contiguous with the opening of the brew chamber;
wherein the piston has a surface and is operable to move into a wipe position where the piston surface is substantially coplanar with the contiguous surface after the piston forces the brewed coffee out of the chamber; and
wherein the wiper is operable to sweep the ground coffee from the piston surface when the piston is in the wipe position.

18. The machine of claim 1, further comprising a cleaning mechanism operable to remove ground coffee from the filter and the wiper after the wiper sweeps the coffee grounds from the piston.

19. The machine of claim 1, wherein machine is operably connected to a water source, and wherein the temperature control unit is operable to utilize water from the water source in order to cool the water from the reservoir to the second predetermined temperature.

20. The machine of claim 19, wherein the temperature control unit is operable mix the water from the reservoir with the water from the water source in order to cool the water from the reservoir to the second predetermined temperature.

21. The machine of claim 20, wherein the temperature control unit is further operable to:
sense a temperature of at least one of the water from the reservoir or the water from the water source, and
mix the water from the reservoir with the water from the water source based at least in part on the sensed temperature.

22. The machine of claim 20, wherein the temperature control unit is further operable to:
mix an amount of the water from the reservoir with an amount of the water from the water source;
sense a temperature of the mixed water; and
adjust at least one of the amount of the water from the reservoir or the amount of the water from the water source based at least in part on the sensed temperature.

23. The machine of claim 19, wherein the temperature control unit is operable to utilize a heat exchanger to cool the water from the reservoir using the water from the water source.

24. The machine of claim 1, wherein the filter comprises:
an outlet; and
one or more ribs arranged to direct brewed coffee that is forced through the filter towards the outlet.

25. A machine for brewing coffee, the machine comprising:
a brew chamber having an opening operable to receive ground coffee;
a reservoir operable to hold water, to heat the water to a first predetermined temperature, and to provide heated water to the brew chamber; and
a piston disposed in the chamber and operable to force brewed coffee out of the chamber through a filter;
wherein the filter is in fixed attachment with a wiper operable to sweep the ground coffee off of the piston after the piston forces the brewed coffee out of the chamber.

26. The machine of claim 25, wherein the filter comprises:
an outlet; and
one or more ribs arranged to direct brewed coffee that is forced through the filter towards the outlet.

* * * * *